United States Patent [19]
Rymer

[11] Patent Number: 6,014,946
[45] Date of Patent: *Jan. 18, 2000

[54] MULTIPLE USE COMMODE ASSEMBLY

[76] Inventor: Jon K. Rymer, P.O. Box 888, Norman, Okla. 73070

[*] Notice: This patent is subject to a terminal disclaimer.

[21] Appl. No.: 08/901,809

[22] Filed: Jul. 28, 1997

Related U.S. Application Data

[63] Continuation of application No. 08/485,115, Jun. 7, 1995, abandoned, and a continuation-in-part of application No. 08/212,204, Mar. 11, 1994, Pat. No. 5,458,089.

[51] Int. Cl.$^7$ .................................................. A01K 29/00
[52] U.S. Cl. .............................. 119/162; 4/246.1; 4/239; 4/246.3
[58] Field of Search ...................... 119/161, 162, 119/163; 4/485, 486, 235, 238, 239, 246.1, 246.3

[56] References Cited

U.S. PATENT DOCUMENTS

| | | | |
|---|---|---|---|
| 1,064,148 | 6/1913 | Lehtonen | 4/238 |
| 2,266,641 | 12/1941 | Joyce et al. | 4/235 |
| 2,676,331 | 4/1954 | Inman | 4/239 |
| 3,430,269 | 3/1969 | Bradshaw . | |
| 3,601,093 | 8/1971 | Cohen | 119/162 |
| 3,603,290 | 9/1971 | O'Rork | 119/162 |
| 3,656,457 | 4/1972 | Houston | 119/162 |
| 3,688,742 | 9/1972 | McGee | 119/162 |
| 3,757,738 | 9/1973 | Hall | 4/420 |
| 3,949,429 | 4/1976 | Hall | 4/486 |
| 4,054,958 | 10/1977 | Widham | 4/486 |
| 4,150,446 | 4/1979 | Crocker | 4/251 |
| 4,153,957 | 5/1979 | Lifton | 4/237 |
| 4,181,096 | 1/1980 | Grubman | 119/162 |
| 4,181,988 | 1/1980 | Skaggs | 4/237 |
| 4,228,554 | 10/1980 | Tumminaro | 119/161 |
| 4,231,321 | 11/1980 | Cohen | 119/162 |
| 4,262,634 | 4/1981 | Piccone | 119/162 |
| 4,271,544 | 6/1981 | Hammond | 4/661 |
| 4,437,430 | 3/1984 | DeBardeleben | 119/162 |
| 4,975,988 | 12/1990 | Won | 4/251 |
| 5,029,347 | 7/1991 | Lin | 4/246.2 |
| 5,103,772 | 4/1992 | Schmid | 119/162 |
| 5,622,139 | 4/1997 | Rymer | 119/162 |
| 5,787,514 | 8/1998 | Erli | 4/239 |

*Primary Examiner*—Michael J. Carone
*Assistant Examiner*—James S. Bergin
*Attorney, Agent, or Firm*—Crowe & Dunlevy

[57] ABSTRACT

A toilet seat device and associated training method for pet animals that permit dual purpose use of a household toilet by both humans and pets, the toilet seat device comprising a toilet seat supported by a commode and having a plurality of shelf segments. The shelf segments are extendible to a protracted position (to reduce the size of the central aperture of the toilet seat) by a cable and roller assembly which interconnects the shelf segments, and the shelf segments are biased to a retracted position when released by the cable and roller assembly to fully open the central aperture.

27 Claims, 14 Drawing Sheets

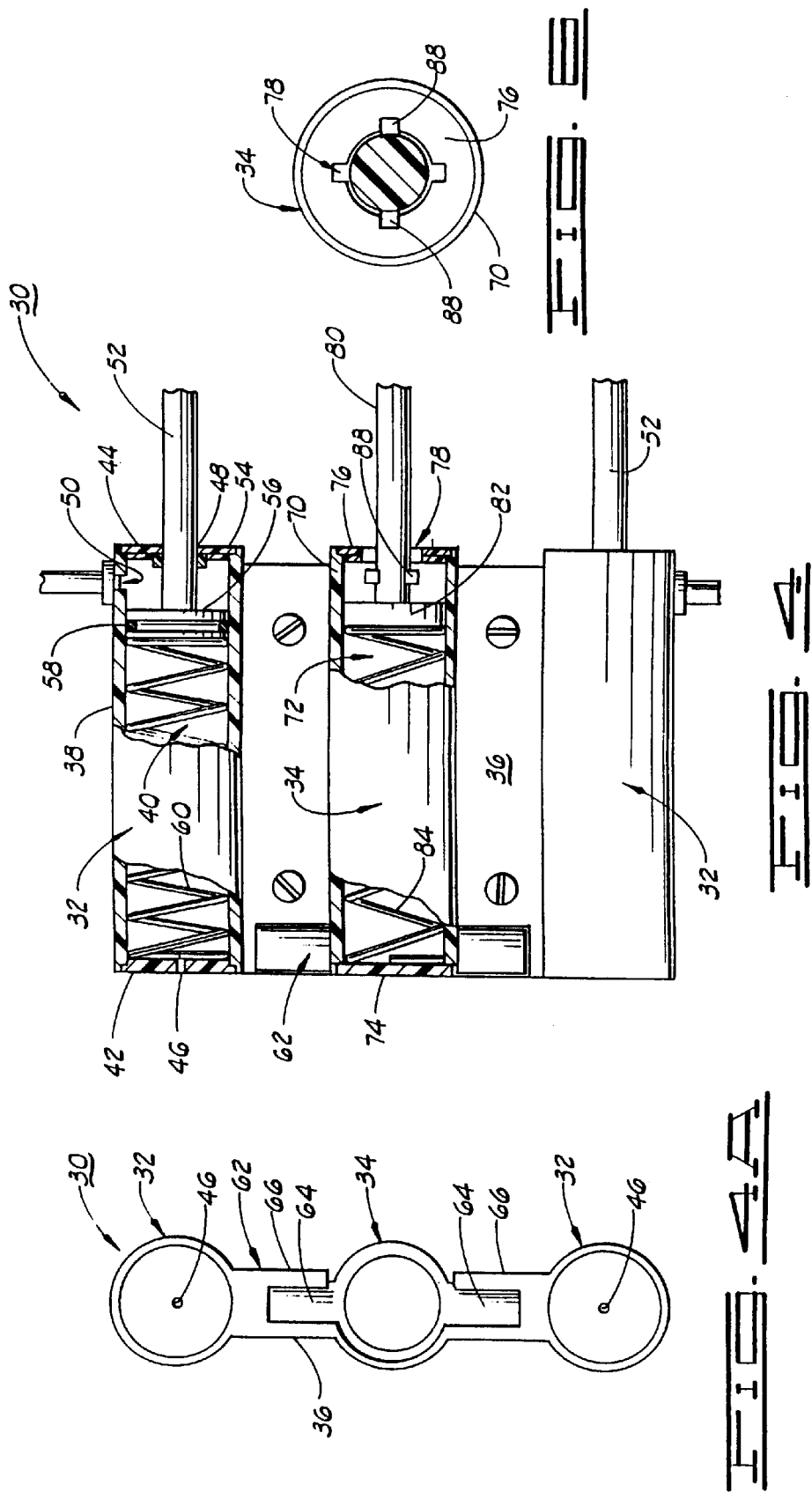

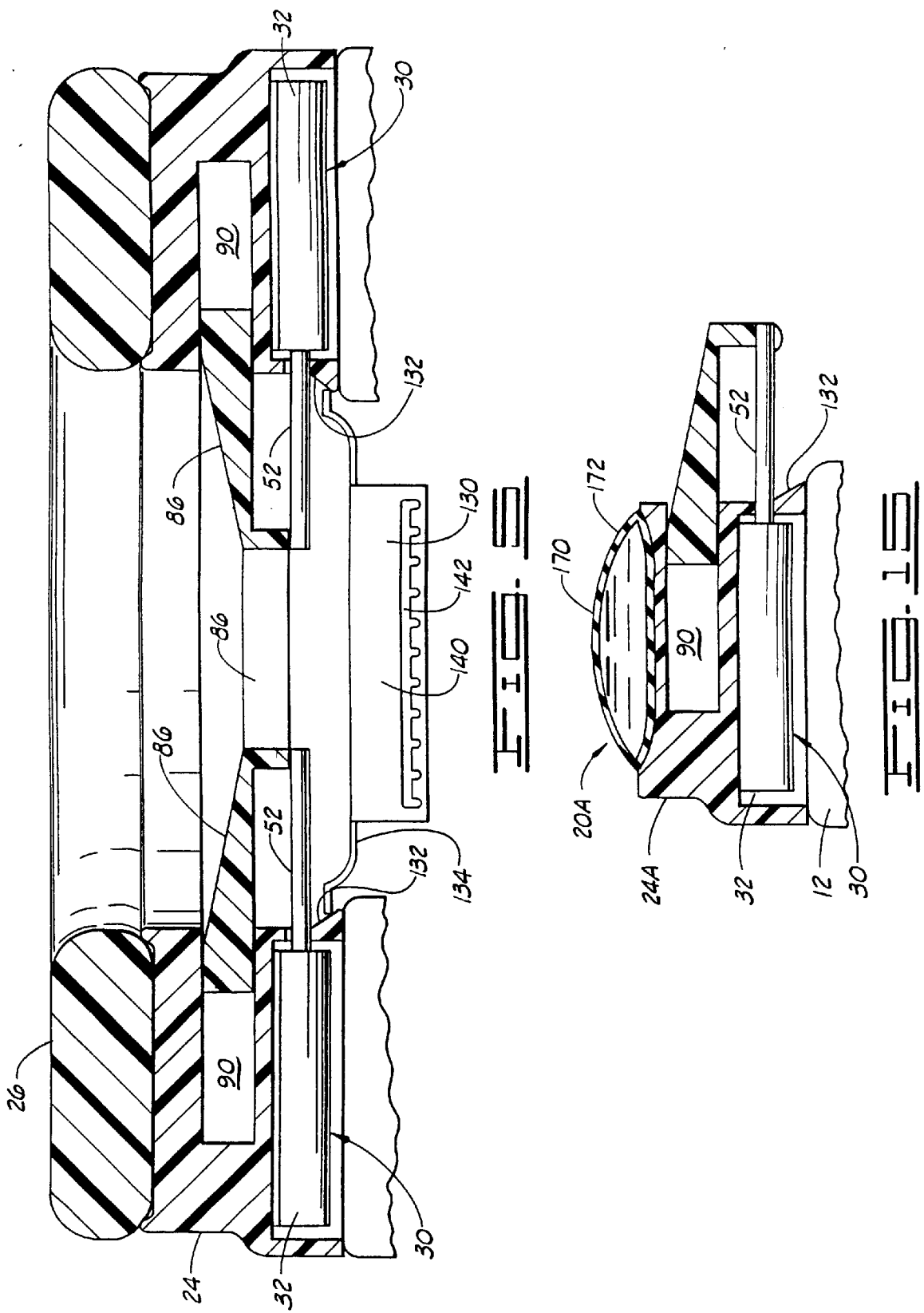

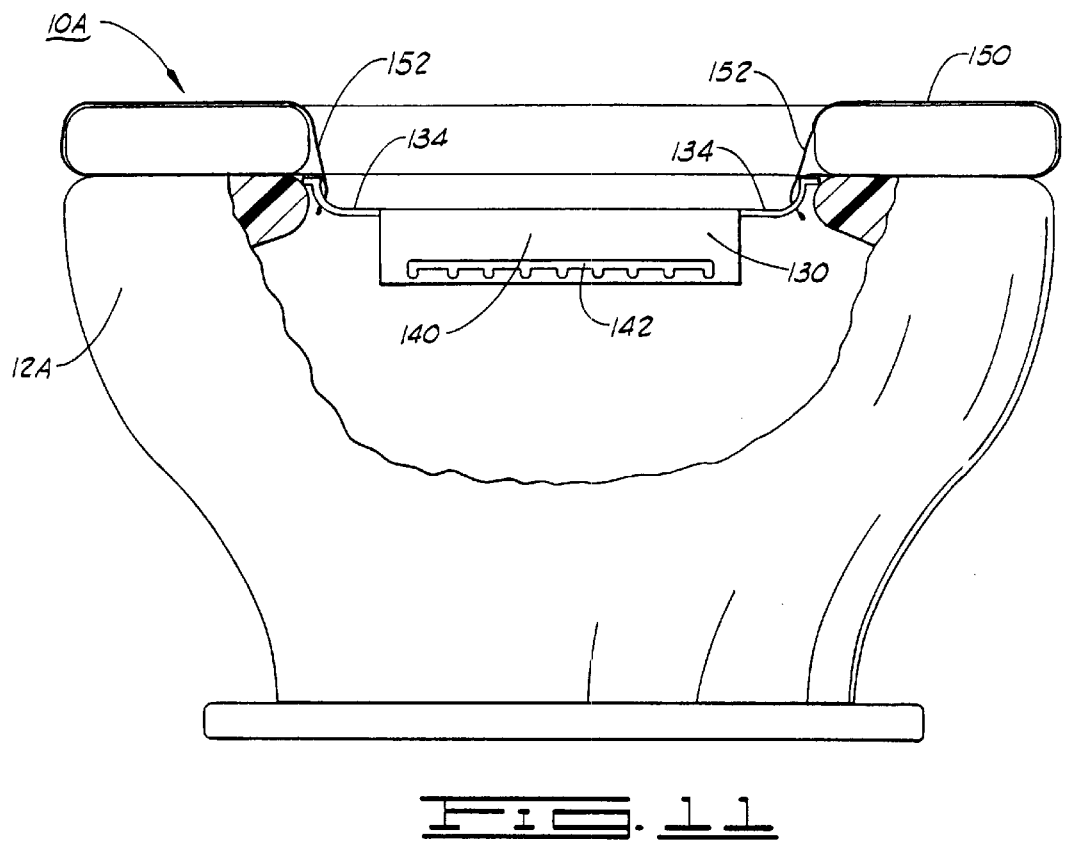
FIG. 11
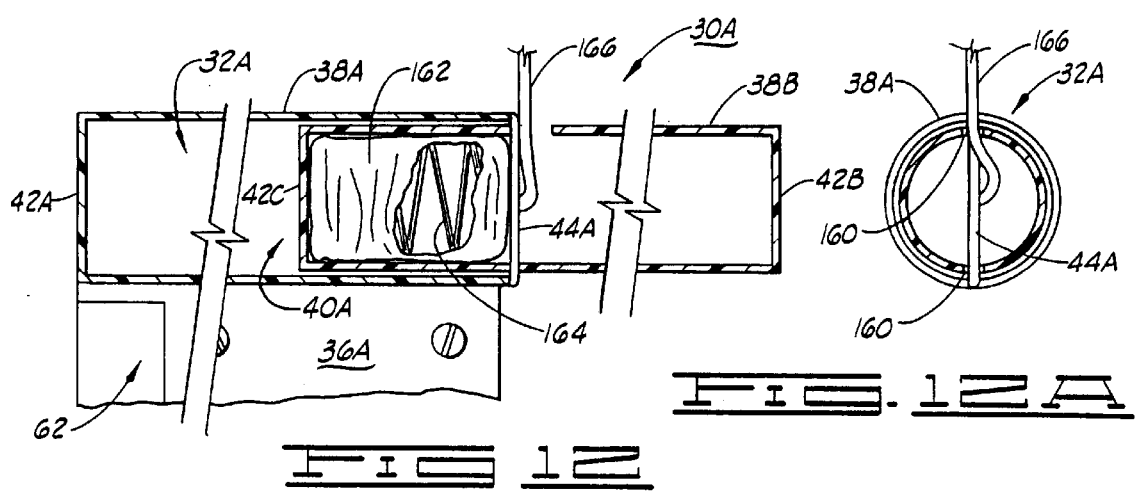
FIG. 12
FIG. 12A

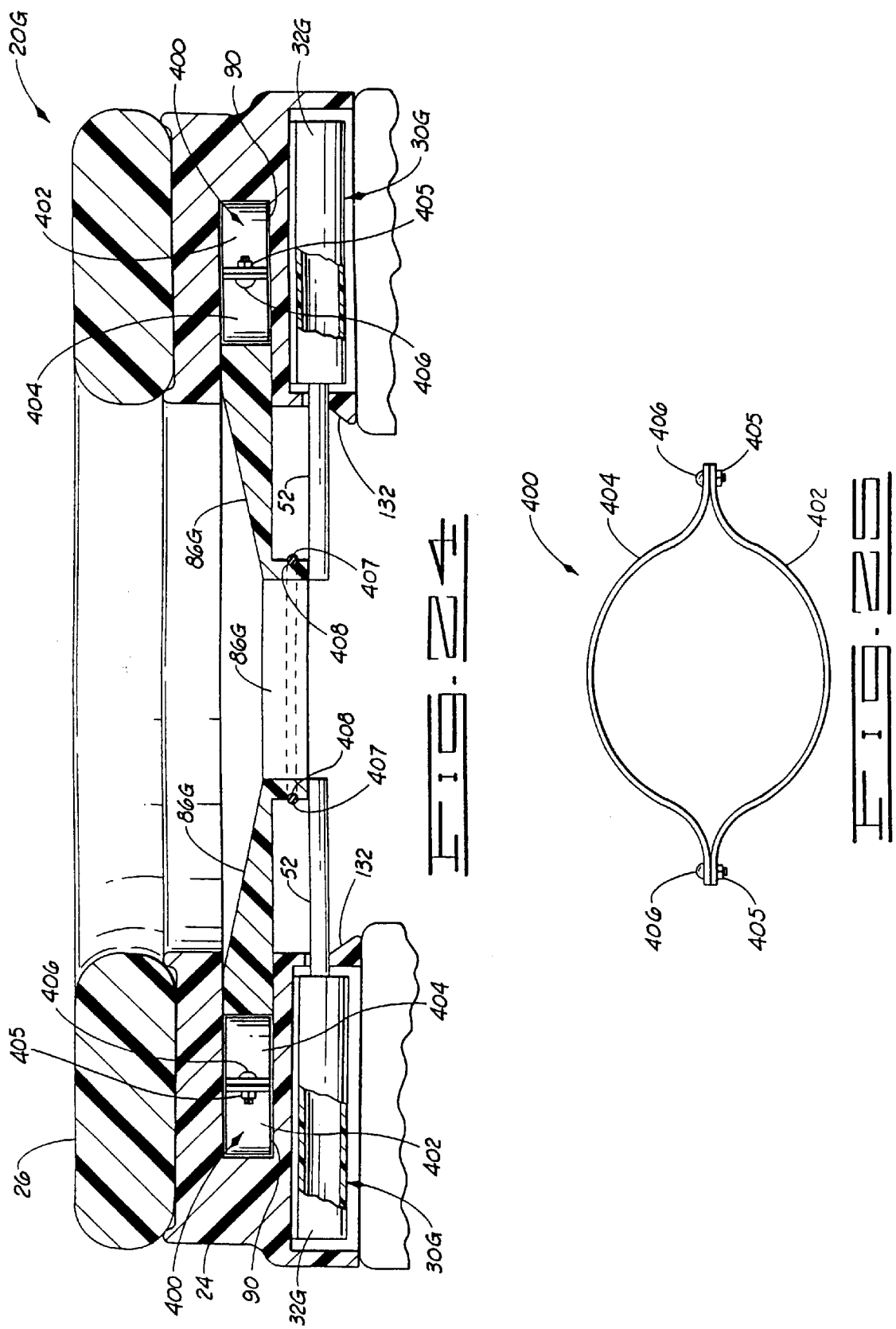

MULTIPLE USE COMMODE ASSEMBLY

CROSS REFERENCE TO RELATED APPLICATION

The present invention is a continuation of U.S. patent application Ser. No. 08/485,115 filed on Jun. 7, 1995 entitled MULTIPLE USE COMMODE ASSEMBLY, abandoned, and a continuation-in-part of Ser. No. 08/212,204, filed Mar. 11, 1994, now U.S. Pat. No. 5,458,089 issued on Oct. 17, 1995 entitled PET COMMODE ASSEMBLY HAVING RETRACTABLE SHELVES RESPONSIBLE TO WEIGHT OF HUMAN ON TOILET SEAT, and the disclosure of such applications are incorporated herein by reference.

BACKGROUND OF THE INVENTION

1. Field of the Invention

The present invention relates to the field of commode assemblies which are adjustable for different sized users, and more particularly but not by way of limitation, to a commode assembly for the training and care of domestic pet animals.

2. Discussion of the Prior Art

Pet animals are nurtured, maintained and loved by countless millions of people in this country and abroad. Since society at large places an inestimable value on life, including that of animals, it is not surprising that domesticated pet animals often have the status of near family and receive care and keeping approaching that of humans.

A necessity that must be attended in the care of domesticated pet animals is that of toilet facilities where such pets are kept indoors for extended periods of time. To this end, numerous prior art patents have been directed toward the adaption or conversion of ordinary toilet facilities for the use of pet animals.

One approach is the permanent toilet structure taught in U.S. Pat. No. 4,228,554, issued to Tumminaro. Another approach is the use of a device that attaches to a conventional household toilet, but must be removed for human use of the toilet. Devices of this type are taught in U.S. Pat. No. 5,103,772 issued to Schmid; U.S. Pat. No. 4,437,430 issued to DeBardeleben; U.S. Pat. No. 4,271,544 issued to Hammond; U.S. Pat. No. 4,231,321 issued to Cohen; U.S. Pat. No. 3,688,744 issued to McGee; U.S. Pat. No. 3,656,457 issued to Houston; and U.S. Pat. No. 4,181,096 issued to Grubman. Still another approach is a device that attaches to a household toilet and does not require removal for human use of the toilet. Devices of this type are taught in U.S. Pat. No. 4,262,634 issued to Piccone; U.S. Pat. No. 3,757,738 issued to Hall; and U.S. Pat. No. 3,949,429 issued to Hall.

Certainly a toilet mounted device offers the benefits of less expense and more convenience than a permanent structure device. There is a need, however, for a device that is initially used in conjunction with the pet's existing litter arrangements and associated habits, such as a litter box, and is then used as a component in an ordered training plan to successfully and humanely train the pet to eliminate into the household commode. By attaching the device to the commode it converts the commode to enable dual usage by both the human and the pet occupants of the household without removing the device from the commode after installation.

SUMMARY OF THE INVENTION

The present invention provides a commode assembly having a toilet bowl in fluid communication with a drain. A water closet is provided for storing a flushing fluid, usually water, for flushing the toilet bowl upon demand, and a toilet seat assembly, supported on the toilet bowl, provides a variable sized central aperture or opening which accommodates human usage of the commode assembly in one mode, and accommodates a pet animal usage in another mode.

The toilet seat assembly, which can be mounted for support on a conventional toilet bowl, has a rim member which forms the central aperture or opening to the toilet bowl, and further, has a plurality of shelf segments which protract to partially close the central aperture and which retract to open the central aperture. In the protracted mode, the shelf segments form a platform capable of supporting a pet animal for toilet use; while in the retracted mode, the shelf segments are disposed to permit human usage of the toilet.

The shelf segments manually protract to partially close the central aperture and retract either manually or automatically to open the central aperture. In the protracted mode, the shelf segments form a platform capable of supporting a pet animal for toilet use, while in the retracted mode, the shelf segments are disposed to permit human usage of the toilet. Internal tension springs position the shelf segments in the retracted mode, while an internal cable and roller assembly, attached to a handle, serves to overcome the force of the springs to position the shelf segments in the protracted mode. In the protracted mode the handle is locked in place by an appropriately placed detent groove, which effectively locks the position of the shelf segments in the protracted mode.

During human usage, a cushion member on the rim member, communicates force in response to the weight of the human to the handle to displace it from the detent groove and thereby unlock the handle from the locked position, allowing the tension springs to retract the shelf segments. Alternatively, the handle can be manually disengaged from the detent groove and pivoted to release the tension on the springs to retract the shelf segments. After human use of the commode assembly, the handle is manually moved to the locked position to move the shelf segments back to the protracted mode.

An object of the present invention is to provide a commode assembly which adjusts to provide toilet accommodations for both pet animal and human users.

Another object of the present invention, while achieving the above stated object, is to provide a toilet device that provides unobstructed use of a household toilet which is normally dedicated to the use thereof by a domestic pet animal.

A further object of the present invention, while achieving the above stated objects, is to provide a commode assembly which converts a conventional toilet bowl to accommodate dual usage thereof by both humans and pet animals.

Yet another object of the present invention, while achieving the above stated objects, is to provide a commode assembly which accommodates both human and pet animal usage while retaining the appearance of a conventional commode assembly.

One further object of the present invention, while achieving the above stated objects, is to provide a dual mode commode assembly for both human and pet animal users which readily affords pet animal training devices and methods.

Another object of the present invention, while achieving the above stated objects, is to provide a dual mode commode assembly accommodating both human and pet animal users and which is economical to manufacture, operate and maintain.

Other objects, features and advantages of the present invention will become apparent from the following description when read in conjunction with the drawings and appended claims.

BRIEF DESCRIPTION OF THE DRAWINGS

FIG. 4 is a partially cutaway, bottom plan view of one of the cylinder and leg assemblies of the toilet seat assembly of FIG. 1;

FIG. 4A is an end view thereof.

FIG. 5 is a sectional view in elevation along the line 5—5 in FIG. 3.

FIG. 6 shows the extend and twist locking action of the leg members of fluid cylinder members of the cylinder and leg assembly of FIG. 4.

FIG. 11 shows another commode assembly in which the training tray is affixed to a conventional toilet seat.

FIG. 12 is a partially cutaway, bottom plan view of a portion of another embodiment of a cylinder and leg assembly; FIG. 12A is an end view of a portion thereof.

FIG. 16 is a perspective view of an alternative embodiment of the commode assembly; FIG. 16A is a sectional view of a portion thereof.

FIG. 24 is an alternative embodiment of the commode assembly of FIG. 5.

FIG. 25 is a top plan view of a simple beam spring assembly.

FIG. 26 is an alternative embodiment of the cylinder and leg assembly of FIG. 4.

DESCRIPTION

Figure 1:
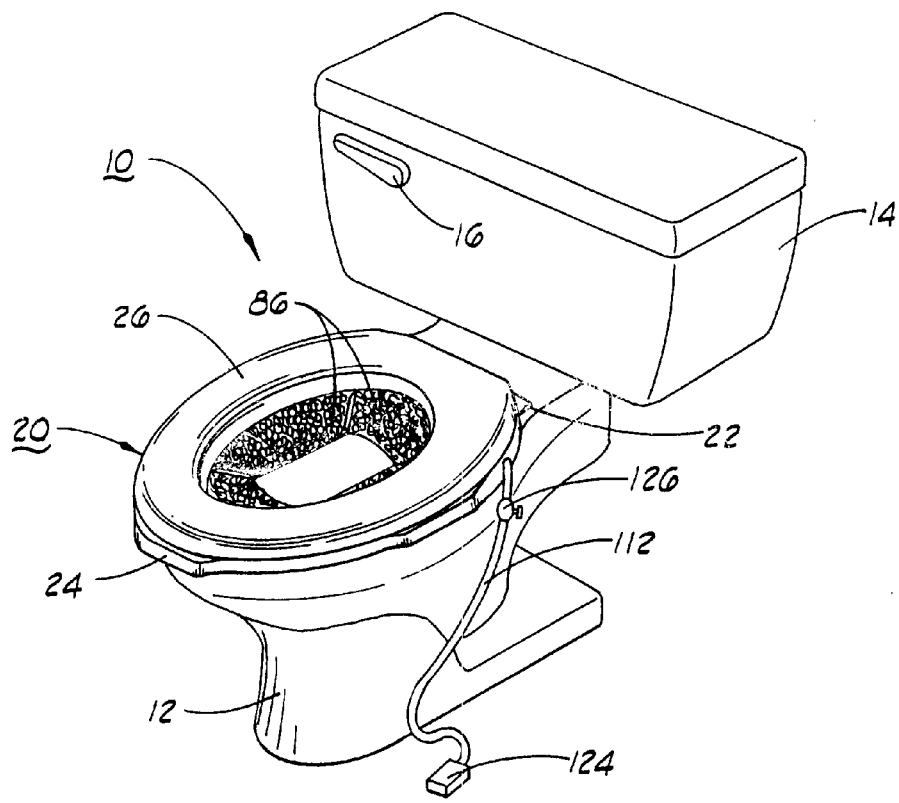
FIG. 1 is a perspective view of a commode assembly constructed in accordance with the present invention.

Referring to the drawings in general, and to FIG. 1 specifically, shown therein is a commode assembly 10 which is constructed in accordance with the present invention. The commode assembly 10 has a toilet bowl 12 and a water closet 14 connected thereto in a conventional manner. The water closet 14 has a flushing lever 16 and contains conventional internal structure (not shown) that, connected to a water supply, provides flushing water to the toilet bowl 12 upon depressing the flushing lever 16. These portions of the commode assembly 10 are conventional and need not be described further herein.

The commode assembly 10 has a toilet seat assembly 20 that is supported on the toilet bowl 12 as shown in FIG. 1. The toilet seat assembly 20 can be attached to the toilet bowl 12 by a connector 22. The connector 22 can be a conventional hinge connector having bolts (not shown) which extend through appropriately located apertures in the toilet bowl 12 in a conventional manner so that the toilet seat assembly 20 will fit common mounting apertures without modification. Alternatively, the hinge connector 22 can be in the form of a permanent member bolted to the toilet bowl 12 via bolts through the bowl apertures, and a pivot mechanism extending from the toilet seat assembly 20 which snaps onto the permanent member. This alternative structure provides for quick removal of the toilet seat assembly 20 for the purpose discussed below.

Figure 2:
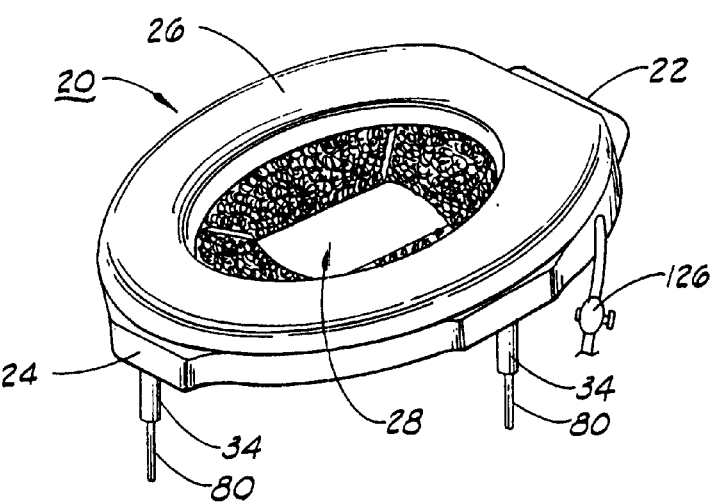
FIG. 2 is a perspective view of the toilet seat assembly of FIG. 1 removed from the toilet bowl and set on a floor surface.
Figure 3:
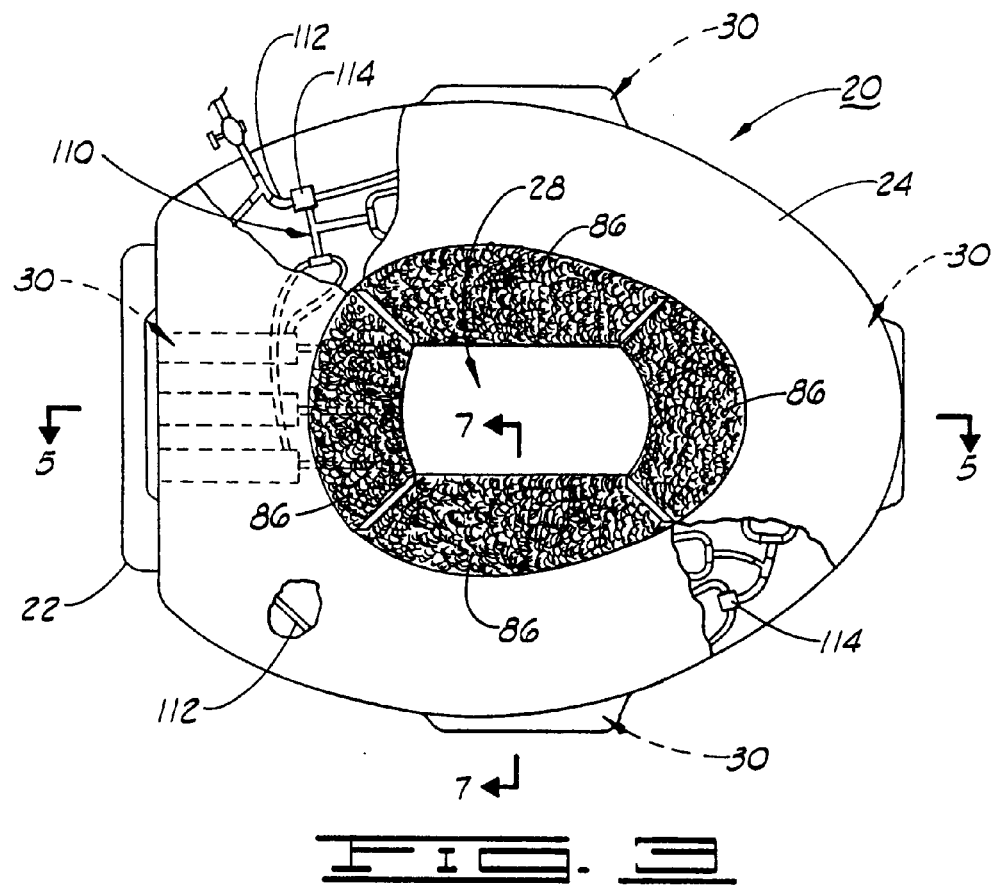
FIG. 3 is a top plan view of the toilet seat assembly of FIG. 2 with portions of the rim member thereof broken away for viewing internal structures thereof.

As shown in FIGS. 1 through 3, the outward appearance of the toilet seat assembly 20 resembles a common toilet seat, consisting of an oval ring shaped rim member 24 and a cushion 26, the rim member 24 forming a central aperture or opening 28 above the toilet bowl 12. Installed on the toilet bowl 12, the toilet seat assembly 20 forms an integral part of the commode assembly 10, and the toilet seat assembly 20 supports either a human user of the commode assembly 10 or a pet animal in the manner discussed hereinbelow for eliminating through the aperture 28 into the toilet bowl 12. A cover member (not shown) can be provided if desired for closing the aperture or opening 28, but such closure must keep open the aperture 28 when the commode assembly 10 is to accommodate a pet animal. This will be made clear by the following description.

The rim member 24 supports multiple sets of cylinder and leg assemblies 30, one of which is shown in FIG. 4. Each cylinder and leg assembly 30 has a pair of parallel fluid cylinders 32 and a rotatable leg member 34 interconnected by a bracket member 36. Each fluid cylinder 32 consists of a cylindrical body 38 having a bore 40, with both ends thereof enclosed by a first cylinder end wall 42 and a second cylinder end wall 44. The bracket member 36 can be integrally formed with the cylindrical bodies 38 as shown.

The first cylinder end wall 42 contains an air bleed port 46 extending through it, allowing air to pass out of and into the bore 40. The second cylinder end wall 44 contains a cylinder shaft aperture 48. The fluid cylinder 32 contains an inlet port 50 extending through the cylindrical body 38, located near the second cylinder end wall 44 end of the fluid cylinder 32. A cylinder shaft 52 passes slidingly through the cylinder shaft aperture 48. A cylinder shaft seal 54 provides a fluid tight seal between the bore 40 and the cylinder shaft aperture 48.

A cylinder piston 56 is affixed to one end of the cylinder shaft 52. The cylinder piston 56 contains a bore seal 58 which provides a fluid tight seal between the cylinder piston 56 and the second cylinder end wall 44. A compressed cylinder spring 60 is disposed in the bore 40 between the cylinder piston 56 and the first cylinder end wall 42. The cylinder spring 60 biases the position of the cylinder piston 56 toward the second cylinder end wall 44 of the fluid cylinder 32.

Pressurized fluid entering the bore 40 through the inlet port 50 fills the bore 40 between the cylinder piston 56 and the second cylinder end wall 44. When the fluid pressure is great enough to overcome the opposing forces of the cylinder spring 60 and the frictional forces on the bore seal 58 and the cylinder shaft seal 54, the cylinder piston 56 is displaced in a direction toward the first cylinder end wall 42 end of the fluid cylinder 32.

The leg member 34 is rotatable via a hinge connector 62, the leg member 34 being thereby rotatable between horizontal and vertical position. As shown in FIG. 4A, the hinge connector 62 comprises a pair of pin members 64 integrally formed with the leg member 34 and ear members 66 formed as part of the bracket member 36. The ear members 66 are shaped to conform to the shape and size of the pin members 64 and are open on one side (not shown) to permit the pin members 64 to be pressed into the ear members 66 for rotatable support thereby. In the vertical position, the leg members 34 can support the toilet seat assembly 20 on a floor surface as shown in FIG. 2 with sufficient clearance to position a litter pan therebelow.

The leg member 34 has a cylindrical leg body 70 forming a cavity 72 which is enclosed on both ends by a leg end wall 74 and a leg end wall 76. The leg end wall 76 contains a slot shaped leg shaft aperture 78 through which a leg shaft 80 passes slidingly. On one end of the leg shaft 80 is affixed a leg piston 82 which is disposed in the cavity 72, and a leg spring 84 is disposed between the leg end wall 74 and the leg piston 82. The compressed leg spring 84 biases displacement of the leg piston 82 in a direction toward the leg end wall 76.

As shown in FIG. 5, the distal ends of the cylinder shafts 52 of the parallel fluid cylinders 32 and the distal end of the leg shaft 80 of the rotatable leg member 34 are attached to the bottom side of a shelf segment 86. The distal end of the leg shaft 80 is attached to the shelf segment 86 in a conventional detent, press fit socket and must first be disconnected from the shelf segment 86 before rotating the leg member 34 from a horizontal to a vertical orientation. The leg shaft 80 has a pair of tabs 88 that extend from opposite sides of the leg shaft 80 and which are clearingly passed through the slot shaped leg shaft aperture 78 when aligned therewith. As shown in FIG. 6, the leg shaft 80, in its extended position, can be rotated so that the tabs 88 are disaligned with the clearance openings of the leg shaft aperture 78 so as to lock the leg shaft 80 in the extended position as shown in FIG. 2.

An alternative embodiment of the leg member 34 can be achieved by disposing a second pair of tabs (not shown) nearer the distal end of the leg shaft 80 so that such tabs can serve to lock the leg shaft 80 in a retracted position within the cylindrical leg body 70. This permits the leg shaft 80 to be locked in a retracted position so that the leg shaft 80 is in a clearing position relative to the shelf segment 86 and thusly does not exert any forceful interaction therewith.

Returning to FIG. 5, the shelf segment 86 slidingly moves radially within a notch 90 in the rim member 24. The radial location of the shelf segment 86 is controlled by the action of the fluid cylinders 32 of the cylinder and leg assembly 30 disposed about the rim member 24. At low fluid pressure, the cylinder pistons 56 are biased outwardly via the cylinder springs 60 to protract the shelf segment 86 radially inward relative to the central aperture 28 of the toilet bowl 12 as shown.

With reference to FIG. 3 once again, it will be noted that four of the cylinder and leg assemblies 30 are disposed about the rim member 24 such that pairs of the cylinder and leg assemblies 30 are in spaced apart and oppositely facing relationship to each other across the central aperture 28. Each such cylinder and leg assembly 30 has the shelf segment 86 associated therewith, and the four shelf segments 86 meet in the protracted position of the cylinder and leg assemblies 30 as shown to partially restrict the central aperture 28.

The protracted orientation of the shelf segments 86 is also depicted in FIG. 5. In the orientation of the shelf segments 86 shown in FIG. 5, the shelf segments 86 overlap each other at the abutting edges, and can be made to interlock at their sides, if necessary, to provide sufficient strength for a rigid and secure platform to support a pet animal, such as a cat. The shelf segments 86 furthermore provide assurance of personal hygiene to the human user of the commode assembly 10, in that the human and the pet do not sit upon a common surface. Thus, there is no likelihood that stray urine of fecal matter from the pet will contact the human user of the commode assembly 10. The shelf segments 86 preferably have a top surface texture that simulates the feel of litter, that is, it is desirable that the top surfaces of the shelf segments 86 are provided with a somewhat roughened surface.

When a human sits on the cushion, the weight thereof causes, in a manner described hereinbelow, an increase in fluid pressure to the cylinder and leg assemblies 30. As the fluid pressure is increased on the cylinder pistons 56 of the cylinder and leg assemblies 30, the cylinder pistons 56 are caused to retract, and this causes the shelf segments 86 to move radially toward the rim member 24. At high fluid pressure, the shelf segments 86 are retracted within the rim member 24, and the central aperture 28 becomes fully exposed as defined by the oval shape of the rim member 24 and cushion 26.

Figure 7:
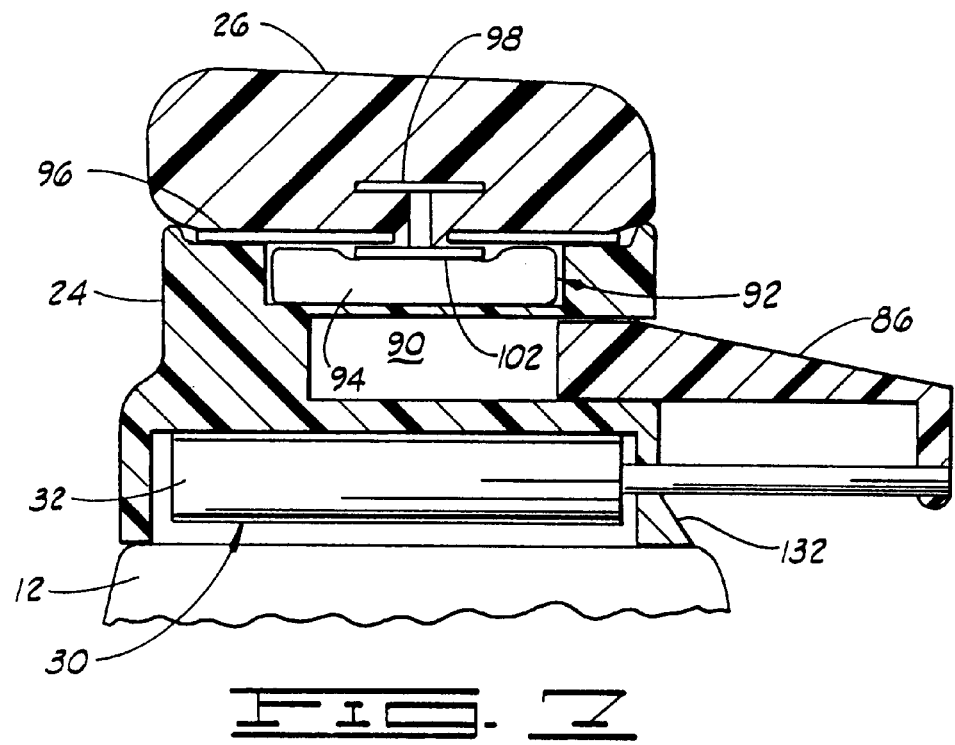
FIG. 7 is a sectional view in elevation along 7—7 in FIG. 3.

Turning now to FIG. 7, a sectional view of the rim member 24 and cushion 26 taken along line 7—7 in FIG. 3 is shown. Disposed in a pair of cavities 92 in the upper surface of the rim member 24, a pair of compressible fluid reservoirs 94 serve to provide pressurized fluid to the fluid cylinders 32 of the cylinder and leg assemblies 30. Any suitable gas or liquid can be used as the fluid. One such cavity 92 and fluid reservoir 94 are shown in FIG. 7; the other cavity 92 and fluid reservoirs 94 are disposed in the rim member 24 directly across the central aperture 28 in opposing fashion thereto. These fluid reservoirs can be constructed from any suitable plastic or elastomeric material which is fluid impermeable and easily deformed.

Figure 8:
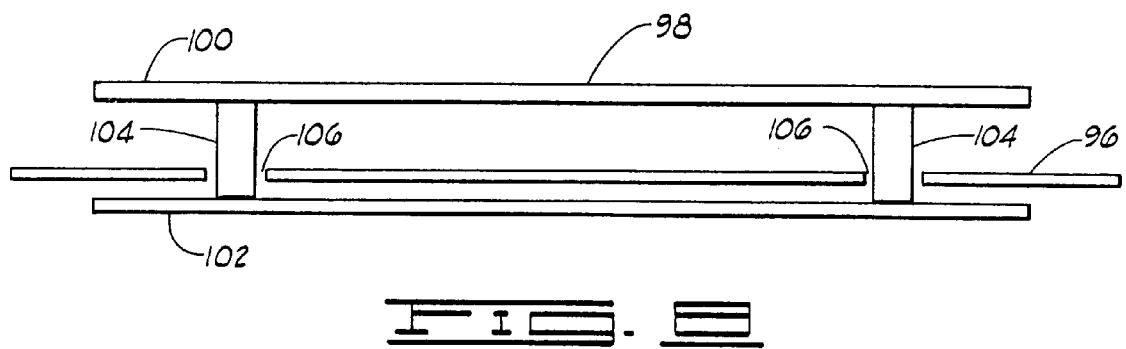
FIG. 8 is an elevational, partially cutaway view of the plunger member and plunger guide plate of the toilet seat assembly of FIG. 3.

Disposed over each cavity 92 is a plunger guide plate 96, located in pressing engagement with each of the fluid reservoirs 94 is a plunger member 98. FIG. 8 shows the relationship of the plunger member 98 and the plunger guide plate 96. Each plunger member 98 has an upper planar member 100 and a lower planar member 102, and a pair of spacer members 104 extend therebetween, passing between apertures 106 in the plunger guide plate 96. The benefit of having the plunger member 98 constructed with the pair of spacer members 104 is that weight is required above these spacer members 104 simultaneously to move the plunger member 98 downwardly. If pressure is applied above only one of the spacer members 104, frictional forces will restrict downward movement of the plunger member 98. The required pressure points may be made sufficiently far apart to ensure that an animal jumping up on, or walking on the cushion 26 will not impart significant compression to the fluid reservoirs 94.

As shown in FIG. 7, each plunger member 98 has its upper planar member 100 disposed within the flexible cushion 26 such as by molding the plunger member 98 to be partially embedded therein. The lower planar member 102 of each plunger member 98 is disposed to rest upon the top of the fluid reservoirs 94 disposed therebelow. In this configuration, the weight of a person sitting on the cushion 26 will cause the cushion 26 to compress, deforming downwardly such that the plunger members 98 are caused to compress the pair of fluid reservoirs 94 on each side of the rim member 24. The purpose of this is to direct pressurized fluid to the cylinder and leg assemblies 30 in the manner to be described below, and the plunger guide plates 96 serve to maintain the plunger members 98 substantially in a horizontally extending disposition as the cushion 26 is compressed, thereby assuring uniform compression of the underlying fluid reservoirs 94.

Figure 9:
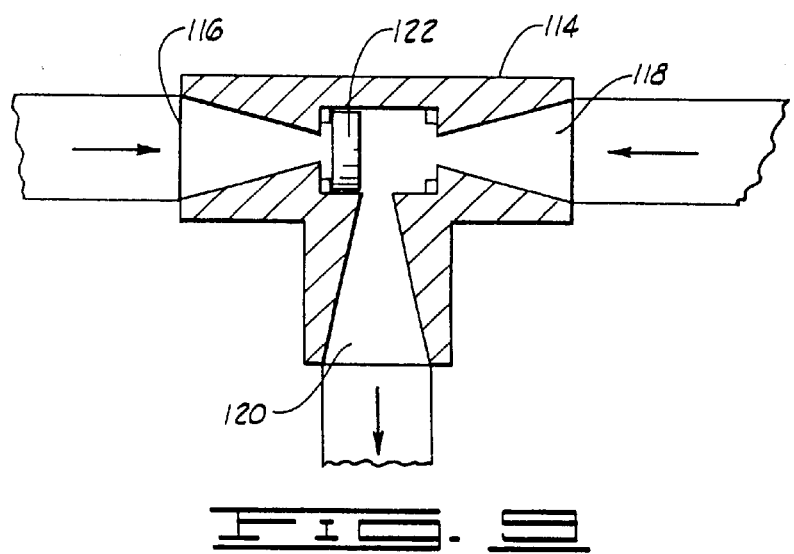
FIG. 9 shows a semi-diagrammatical, partially cutaway view of a shuttle valve of the toilet seat assembly of FIG. 3.

Referring to FIG. 3, compression of the fluid reservoir 94 causes high pressure fluid to be sent from the fluid reservoirs 94 to a tubing assembly 110 which comprises connecting tubing 112 and a pair of shuttle valves 114. One of the shuttle valves 114 is shown in FIG. 9 and has a first inlet port 116, a second inlet port 118 and an outlet port 120 (fluid direction is indicated by the arrow indicia). The shuttle valve 114 has an internal shuttle 122 that is shown in a sealing position relative to the first inlet port 116, and conventionally, is shifted by pressure differential to a position that seals the second inlet port 118 and thereby opens the first inlet port 116. Thus, fluid pressure to either the first or second inlet ports 116, 118 will pass such pressurized fluid to the outlet port 120.

As shown in FIG. 3, the outlet ports 120 of the shuttle valves 114 are connected in parallel to the inlet ports 50 of the cylinder and leg assemblies 30 while connecting outlet ports (not shown) of the fluid reservoir 94 in parallel to the first inlet ports 116 of the shuttle valves 114. Thus the shuttle valves 114 permit passage of the high pressure fluid (emitting from the fluid reservoirs 94 when compressed by the weight of a human user on the cushion 26) through the tubing 112, through the first inlet port 116 to the outlet port 120, while sealing leakage of the high pressure fluid to the second inlet port 118.

Connected to the second inlet ports 118 of the shuttle valves 114 via the connecting tubing 112, in parallel, is a foot reservoir 124. Similar to the fluid reservoirs 94, the foot reservoir 124 is constructed of a compressible, non-permeable plastic or elastomeric material. Containing a quantity of the same fluid in the fluid reservoirs 94, the foot reservoir 124 is disposable on a floor surface for easy access and depression by the foot of a human user of the commode assembly 10. When so depressed by foot pressure, fluid pressure passes to the second inlet ports 118, shifting the internal shuttles 122 to seal the first inlet ports 116, causing fluid pressure to pass through the outlet ports 120 of the shuttle valves 114.

Thus when the fluid reservoirs 94 are compressed (by the weight of a human user on the cushion 26), high pressure fluid is transmitted therefrom through the shuttle valves 114 via the tubing assembly 110 to the cylinder and leg assemblies 30, thereby effecting the retraction of the shelf segments 86 which fully opens the central aperture or opening 28. When the human user arises, the compression of the fluid reservoirs 94 is relieved, and the cylinder and leg assemblies 30, having the pressure released thereon, extend the shelf segments 86 to assume the protracted position depicted in FIGS. 3 and 5.

On the other hand, should the human user desire to open the central aperture 28 while standing at the commode assembly 10, foot pressure on the foot reservoir 124 also effects opening thereof by passing pressurized fluid through the shuttle valves 114 to effect pressurization of the cylinder and leg assemblies 30 to retract the shelf segments 86 so long as such foot pressure is maintained. A two position valve 126 is disposed in the tubing 112 as shown in FIG. 1, and with foot pressure on the foot reservoir 124, the human user can move the valve 126 from its open position to its closed position, thereby maintaining fluid pressure on the cylinder and leg assemblies 30 while removing foot pressure from the foot reservoir 124. This serves to keep the shelf segments 86 in their retracted mode until the valve 126 is opened.

As shown in FIG. 3, the tubing assembly 110 and the shuttle valves 114 are preferably disposed within a cavity or channels in the underside of the rim member 24, or alternately, molded within cavities of the rim member 24 when formed.

Returning to FIG. 5, shown therein is a training tray 130 which is supported on the rim member 24. The training tray 130 is used as an aid in training a pet animal in the proper use of the commode assembly 10, and the training method suggested herein will be described in detail hereinbelow. First, however, it will be necessary to describe the training tray 130 and its use with the toilet seat assembly 20.

The rim member 24 has a support ridge 132 which extends therefrom and about the central aperture or opening 28 in the toilet bowl 12 as shown. This support ridge 132 is dimensionally established, as is the training tray 130, such that the training tray 130 is supportable thereon in the manner depicted.

Figure 10:
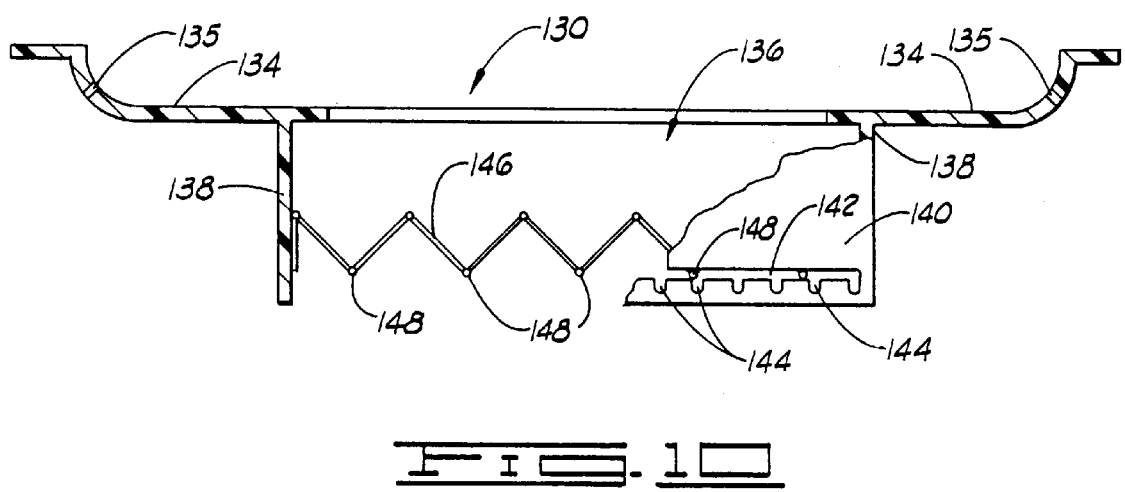
FIG. 10 shows a partially cutaway, side elevational view of a training tray which is used in conjunction with the toilet seat assembly of FIG. 3.

FIG. 10 is a view of the training tray 130 which is a box like structure having a bottom which can be opened in stages, which, as will be made more clear below, assists in training a pet animal user of the toilet seat assembly 20 to become acquainted with the water below in the toilet bowl 12. The training tray 130 consists of a bowed top member 134 which forms a central aperture 136, the top member 134 having a plurality of apertures 135 which are useful for a purpose to be discussed hereinbelow. Extending downwardly from underneath the top member 134 are side members 138 and 140 which form a box like structure open at both top and bottom. The side members 140 have parallel slots 142, each of such slots 142 having multiple detents 144 as shown.

Attached to the inner surface of one of the side members 138, such as by adhesive or thermal bonding, is a folding shelf 146 which is accordion shaped to permit the folding shelf 146 to collapse as it is moved from a closed position (in which the folding shelf 146 closes off the central aperture of the training tray 130) to an open position (in which the folding shelf 146 is positioned to substantially open the central aperture of the training tray 130).

The folding shelf 146 has a plurality of tabs 148 extending from each side thereof and which are formed as an integral part of the folding shelf 146 at each of the folds thereof. The tabs 148 of the folding shelf 146 are retained in the parallel slots 142 and permit the folding shelf 146 to be folded or extended therealong to establish the amount of exposure through the central aperture 136. When the desired amount of exposure is achieved, the folding shelf 146 is locked into place by pressing the tabs 148 downwardly into the selected detents 144.

As will now become clear by turning to a description of the training method, the training tray 130 is placed on the support ridge 132 of the rim member 24 for use by a pet animal. It is suggested that the toilet seat assembly 20 be placed on the floor to replace the pet animal's litter box at the location where the pet animal's litter box has normally been situated. This is achieved by removing the toilet seat assembly 20 from the toilet bowl 12, extending and rotating the leg members 34 as described hereinabove and placing the toilet seat assembly 20 as depicted in FIG. 2. The shelf segments 86 are retracted by compressing the foot reservoir 124 and locking these in their retracted mode by closing the valve 126.

The training tray 130 is closed (by extending the folding shelf 146 to its closed position) and placed on the rim member 24. Litter is now placed on the folding shelf 146 and on the bowed top member 134. It is advisable to use a portion of the used litter from the prior litter box together with some new litter. The prior litter box should be removed so as to leave the training tray 130 as the only one available to the pet animal. The pet animal will now use the litter in the training tray 130 and should be allowed to use it in this familiar location for a few days.

The next step in the training is to move the toilet seat assembly 20 to a location immediately adjacent to the toilet bowl 12. At this stage, the shelf segments 86 continue to be in the retracted position. This step in the training affords the pet animal the use of its litter box (by now the training tray 130) in a location in near proximity to the toilet bowl 12, and the pet animal should be allowed a few days to become accustomed to having its litter box in this new location.

Once the pet animal has become accustomed to using its litter box (the training tray 130) next to the toilet bowl 12, the next step is to protract the shelf segments 86 by opening the valve 126, and to permit the pet animal to get used to using the toilet seat assembly 20 in this profile. The protracted shelf segments 86 reduce the size of the pet animal's litter box to about the dimensions of the folding shelf 146 in its closed position.

Once the pet has become accustomed to use of the litter in the training tray 130 (that is, sufficient time has passed in which the toilet seat assembly 20 has become identified as the pet's litter box) in this profile, the leg members 34 are folded up and the toilet seat assembly 20 is reattached to the toilet bowl 12, replacing the conventional seat. The training tray 130, with the old litter, remains on the rim member 24.

The shelf segments 86 and the training tray 130 are dimensioned such that the shelf segments 86 provide a supporting surface immediately surrounding the aperture or opening 136 of the training tray 130 so that the litter on the folding shelf 146 is visible below the shelf segments 86.

Once the pet animal has used the litter in the training tray 130 in its position over the toilet bowl 12, the folding shelf 146 of the training tray 130 is opened just enough to somewhat expose the water in the toilet bowl 12 below. The pet will continue to use the litter but will now become accustomed to seeing water below. The folding shelf 146 can then be opened gradually over time so that less and less of the litter is available and more of the water is in view as the pet continues to use the litter in the training tray 130 over the toilet bowl 12.

As the water below the training tray 130 becomes familiar to the animal, and the amount of litter available to the animal becomes less, there will be a point in time when the training tray 130 can be removed. If, at this point, the pet continues to use the toilet seat assembly 20 in the manner before removed, the training tray 130 can be permanently removed. Should there be any hesitancy by the pet in such continued usage, the cycle of litter training on the toilet seat assembly 20 can be repeated as necessary. However, this will be rare, as pets will usually quickly adapt to the usage of the toilet seat assembly 20 with the training tray 130 removed, perching upon the protracted shelf segments 86 while eliminating through the reduced central aperture or opening 28 into the water contained in the toilet bowl 12.

Once the pet animal has been trained to use the commode assembly 10 without the training tray 130 in place, the commode assembly 10 is readily usable by both humans and pet animals in the manner and for the reasons described hereinabove.

FIG. 11

The training tray 130 can also be used by itself to train a pet animal to eliminate in a conventional toilet bowl. FIG. 11 depicts a commode assembly 10A which has the toilet bowl 12A and a water closet (not shown) connected thereto in a conventional manner. The commode assembly 10A has a conventional toilet seat 150 which is an oval ring shaped member supported on the toilet bowl 12A for the support of either a human or a pet animal user of the commode assembly 10A. The toilet seat 150 may have a lid (not shown) pivotally connected thereto in a conventional manner.

As shown in FIG. 11, the training tray 130 can be secured to the toilet seat 150 by way of string members 152 which are passed through the apertures 135. Thus, as demonstrated here, the training tray 130 can be used with a conventional commode assembly 10A to train a pet animal, such as a household cat, to use the toilet bowl 12A in lieu of a litter box.

The training tray of a pet animal using the training tray 130 in the manner depicted in FIG. 11 is similar to that described hereinabove. Since the toilet seat 150 affixed to the toilet bowl 12A does not have retractable support legs like that of the toilet seat assembly 20 described above, the starting point in the training is to place the training tray 130 on the floor to replace the pet animal's litter box at the location where its regular litter box has normally been situated.

The training tray 130 is closed by extending the folding shelf 146 in its closed position. Litter is placed on the folding shelf 146 and on the bowed top member 134. It is advisable to use a portion of the used litter from the prior litter box together with some new litter. The prior litter box should be removed so as to leave the training tray 130 as the only one available to the pet animal. The pet animal will now use the litter in the training tray 130 and should be allowed to use it in this familiar location for a few days.

The next step in the training is to move the training tray 130 to a location immediately adjacent the toilet bowl 12A. This step in the training affords the pet animal the use of its litter box (now the training tray 130) in a location in near proximity to the toilet bowl 12A, and the pet animal should be allowed a few days to become accustomed to having its litter box in this new location.

Once the pet animal has become accustomed to using its litter box (the training tray 130) next to the toilet bowl 12A, the next step is to affix the training tray 130 to the toilet seat 150 as described above using the string members 152. Once the pet animal has become accustomed to using the litter in the training tray 130 in its position over the toilet bowl 12A, the folding shelf 146 of the training tray 130 is opened just enough to somewhat expose the water in the toilet bowl 12A below. The pet will continue to use the litter but will now become accustomed to seeing water below. The folding shelf 146 (see FIG. 10) can then be opened gradually over time so that less and less of the litter is available and more of the water is in view as the pet continues to use the litter in the training tray 130 over the toilet bowl 12A.

As the water below the training tray 130 becomes familiar to the animal, and the amount of litter available becomes less, there will be a point in time when the training tray 130 can be removed. If, at this point, the pet continues to use the toilet seat assembly 20 in the manner before removal, the training tray 130 can be permanently removed. Should there be any hesitancy by the pet in such continued usage, the cycle of litter training on the training tray 130 can be repeated as necessary. However, this will be rare, as pets will usually quickly adapt to the usage of the training tray 130 removed, perching upon the toilet seat 150 while eliminating into the water contained in the toilet bowl 12A.

FIGS. 12–12A

Another embodiment of a cylinder and leg assembly 30A is shown in FIG. 12. The cylinder and leg assembly 30A is identical in function to the cylinder and leg assemblies 30 described hereinabove (and as shown in FIGS. 4–5), so the same numbers with appropriate letter suffixes will be used to indicate such identity of function.

As described above, the rim member 24 supports multiple sets of the cylinder and leg assemblies 30, and in like manner, in the alternate construction described herein, the rim member 24 can support multiple sets of the cylinder and leg assemblies 30A, one of which is partially shown in FIG. 12. Each cylinder and leg assembly 30A has a pair of parallel fluid cylinders 32A and a rotatable leg member 34 (not shown in FIG. 12) connected by a bracket member 36A. The leg member 34 is rotatable via a hinge connector 62. Each fluid cylinder 32A consists of an outer cylindrical body 38A having a bore 40A, one end of the bore 40A enclosed by an end wall 42A as shown. The other end of the outer cylindrical body 38A is partially closed by an end bar 44A (more clearly shown in FIG. 12A).

An inner cylindrical body 38B slides within the outer cylindrical body 38A so that a portion thereof is disposed within the bore 40A. The extending end of the inner cylindrical body 38B is closed by an end wall 42B. The end of the inner cylindrical body 38B within the bore 40A is closed via an end wall 42C. The inner cylindrical body 38B has a pair of slots 160 on opposite sides thereof to provide clearance for the end bar 44A as the inner cylindrical body 38B slides within the outer cylindrical body 38A.

An expandable fluid reservoir 162 is disposed within the inner cylindrical body 38B at the junction of the outer cylindrical body 38A and the inner cylindrical body 38B as shown. The fluid reservoir 162 is affixed to the end wall 42C of the inner cylindrical body 38B, and to the end bar 44A of the outer cylindrical body 38A, such as by an adhesive bonding. Disposed within the fluid reservoir 162 is a spring 164. A compressed fluid tube 166 passes through one of the slots 160 in the inner cylindrical body 38B and is preferably adhesively bonded to the end bar 44A. The compressed fluid tube 166 passes through an aperture in the fluid reservoir 162 and is bonded thereto as it terminates inside the fluid reservoir 162. This is best shown in FIG. 12A. It should be noted that the outer cylindrical body 38A and the inner cylindrical body 38B are shown as being transparent in order to show the components described, and preferably, are made of a rigid polymeric material.

In like manner to that of the cylinder shafts 52 of the parallel fluid cylinders 32 of the cylinder and leg assemblies 30, the distal or extending ends of the inner cylindrical bodies 38B (having the end walls 42B) are attached to the bottom side of the shelf segments 86, such as by adhesive bonding or by a compression socket fit. The spring 164 biases the inner cylindrical body 38B toward its protracted mode in the absence of compressed fluid in the tube 166; the tube 166 is connected to the fluid reservoirs 94 and the foot reservoir 124 via the connecting tubing 112. The fluid reservoir 162 is preferably formed from an elastomeric material, one which can expand and contract without great resistance. When high pressure fluid enters the fluid reservoir 162 via the tube 166, the fluid reservoir 162 expands. This expansion communicates linear motion to the end wall 42C, which thus retracts the inner cylindrical body 38B into the outer cylindrical body 38A; this causes the retraction of the shelf segments 86 in the same manner and for the same reason discussed hereinabove.

FIGS. 13–15

Figure 13:
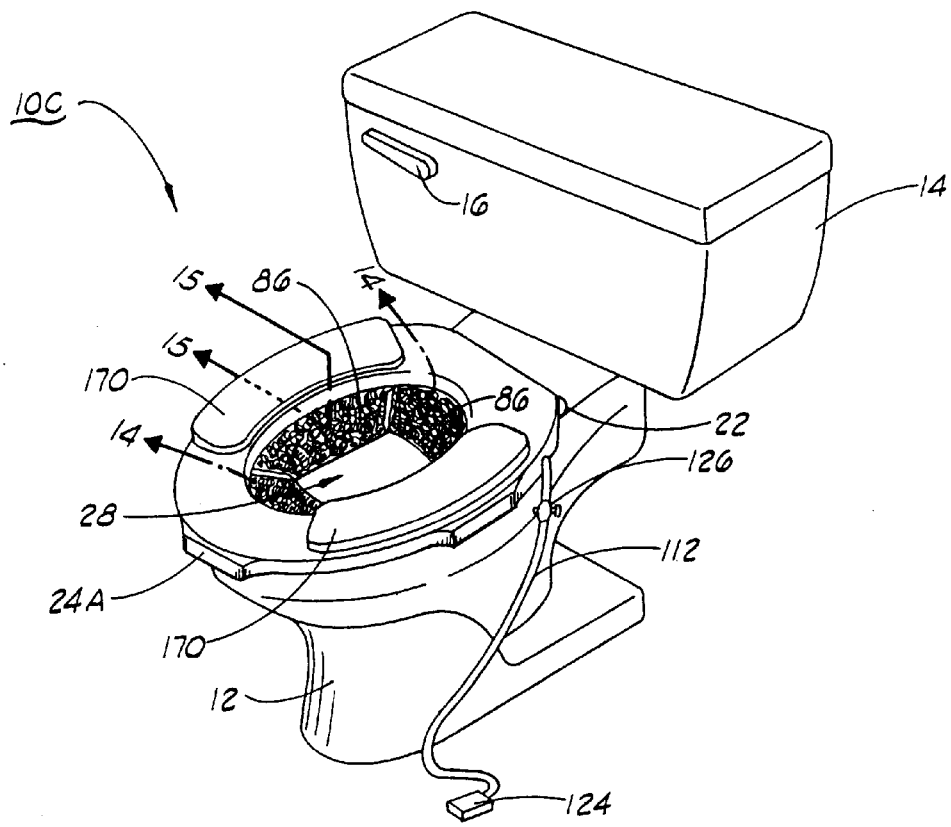
FIG. 13 is a perspective view of another commode assembly also constructed in accordance with the present invention.

Shown in FIG. 13 is a commode assembly 10C, which is another embodiment of the present invention. The commode assembly 10C is identical in function to the commode assembly 10 described hereinabove, so the same numbers with appropriate letter suffixes will be used to indicate such identity of function.

The commode assembly 10C has a toilet bowl 12 and a water closet 14 connected thereto in a conventional manner. The water closet 14 has a flushing lever 16 and contains conventional internal structure (not shown) that, connected to a water supply, provides flushing water to the toilet bowl 12 upon depressing the flushing lever 16. These portions of the commode assembly 10C are identical to the commode assembly 10 described above.

The commode assembly 10C has a toilet seat assembly 20A that is supported on the toilet bowl 12 as shown in FIG. 1. The toilet seat assembly 20A is attached to the toilet bowl 12 by a hinge connection 22 having bolts (not shown) which extend through appropriately located apertures in the toilet bowl 12 in a conventional manner so that the toilet seat assembly 20A will fit common mounting apertures without modification.

The toilet seat assembly 20A consists of an oval ring shaped rim member 24A having integrally formed cushions 170 which serves the same function as that of the cushion 26 of the commode assembly 10 above, and will be described below. With this exception, the structure of the rim member 24A is the same as the rim member 24 described above.

Figure 14:
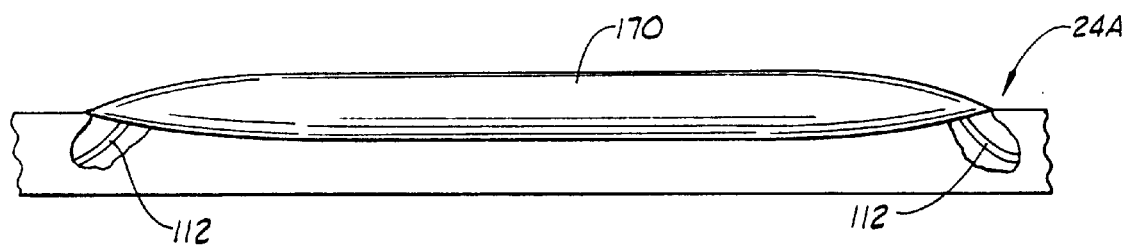
FIG. 14 is a partial view of the toilet seat assembly of, and taken at 14—14 in, FIG. 13.

One of the cushions 170 is shown in FIG. 14 which also shows such connected to the connecting tubing 112. Each cushion 170 serves as a fluid reservoir which functions identically to that of the fluid reservoirs 94 described hereinabove. That is, each of the cushions 170 is constructed from a plastic or elastomeric material and has a hollow interior which is filled with a liquid or fluid.

Figure 15:
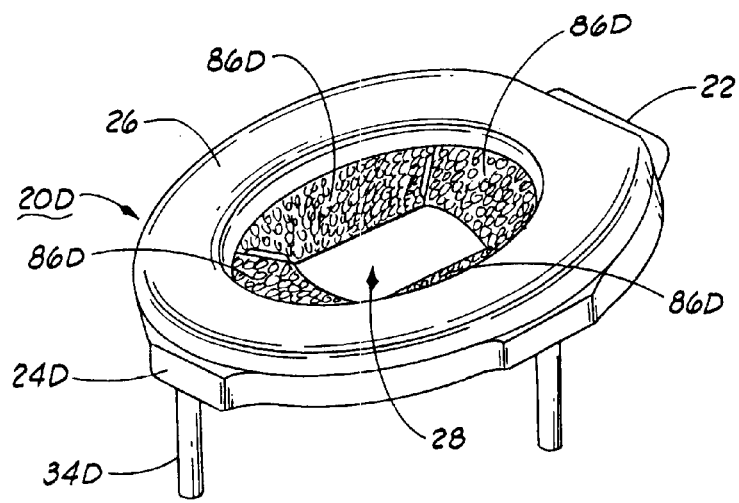
FIG. 15 is a cross sectional view of the toilet seat assembly of, and taken at 15—15 in, FIG. 13.
Figure 15A:
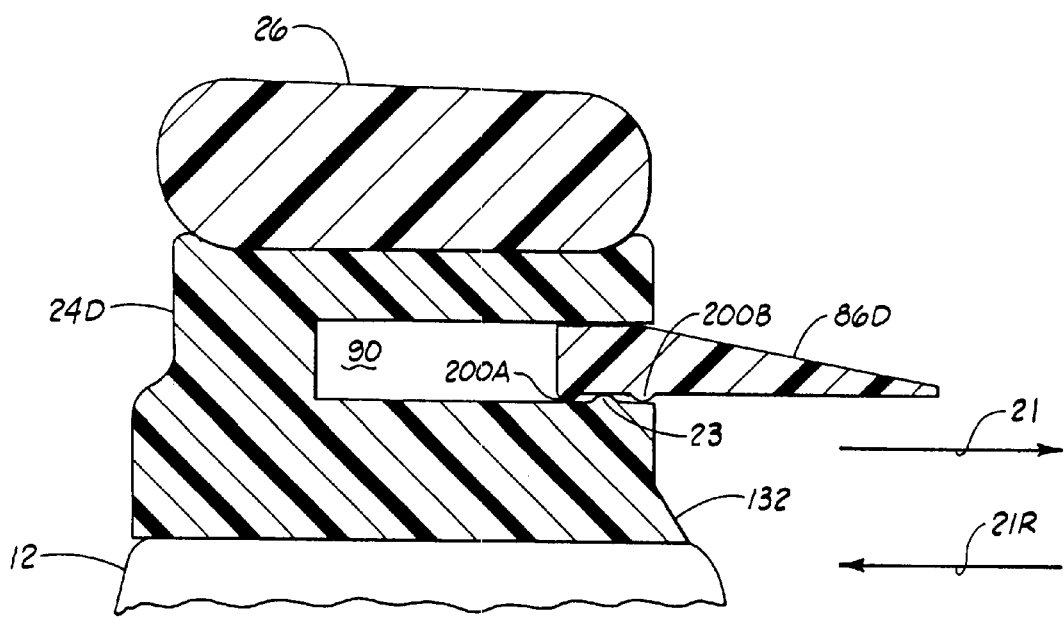

FIG. 15 shows the toilet seat assembly 20A in cross sectional detail, with the cylinder and leg assemblies 30 supported on the underside of the rim member 24A. The cushions 170 are integrally formed with the rim member 24A, and since the cushions 170 serve as compressible fluid reservoirs in fluid communication with the connecting tube 112, the overall height dimension of the toilet seat assembly 20A is less than that of the above described toilet seat assembly 20; this is achieved due to the elimination of the separate fluid reservoirs 94, making the appearance of the toilet seat assembly 20A more closely approaching a conventional toilet seat cover.

Preferably, the seat cushion 170 has an upper surface 172 which has a greater thickness dimension, such as by multiple layer vulcanizing, so that this tough upper surface 172 will be resistant to damage from the claws of a cat or other pet animals.

The weight of a person sitting on the cushions 170, either together, or on either one of same, will cause the cushions 170 to compress, deforming downwardly such that pressurized fluid is provided, via the connecting tubing 112, to the cylinder and leg assemblies 30 in the manner described above for the toilet seat assembly 20A, thereby effecting the retraction of the shelf segments 86 which fully opens the central opening 28. When the human arises, the compression of the fluid reservoirs of the cushions 170 is relieved, and the cylinder and leg assemblies 30, having the pressure released thereon, extend the shelf assemblies 86 to assume their protracted positions.

FIG. 16 and 16A

Referring now to FIG. 16, shown is a toilet seat assembly 20D which is another embodiment of the present invention. The toilet seat assembly 20D is identical in function to the toilet seat assembly 20 described hereinabove except as follows, so the same numbers will be used with appropriate letter suffixes to indicate such identity of function.

The toilet seat assembly 20D has an oval shaped rim member 24D, a cushion 26 on the rim member 24D, retractable leg members 34D connected to the rim member 24D, and retractable shelf segments 86D that retract into the rim member 24D to variably adjust the size of a central aperture 28. The shelf segments 86D are similar to the shelf segments 86 described hereinabove, except that the shelf segments 86D operate manually and can be pulled in the direction of arrow 21 (FIG. 16A) to assume the protracted position shown in FIG. 16, or can be pushed in the direction of 21R to assume the retracted position and fully open the central aperture 28D.

A means for locking the shelf segments 86D in the protracted position, or shelf locking means, comprises a pair of spaced apart detents 200A, 200B on the shelf segment 86D (as shown in FIG. 16A). The detents 200A, 200B are disposed to engage a lip portion 23 of the rim member 24D as the shelf segment 86D is pulled out. The dimensions and spacing of the detents 200A, 200B and lip portion 23 are selected to permit passage of the detent 200B with a modest amount of hand pressure, while restricting reverse passage unless such pressure is exerted in the retracting direction 21R. The dimension of detent 200A is somewhat larger than the detent 200B so that substantially more hand pressure is required to completely remove the shelf segment 86D. Thus, the detents 200A and 200B work in conjunction with the rim member 24D to secure the shelf segments 86D in the protracted mode when the shelf segments 86D are manually protracted.

It will be apparent that other suitable shelf locking means equivalent in function to the detents 200A, 200B will also retain the shelf segments when protracted to allow pet animal usage of the toilet, and such other shelf locking means are included within the scope of the present invention.

FIG. 17, 17A, 17B, and 17C

Figure 17:
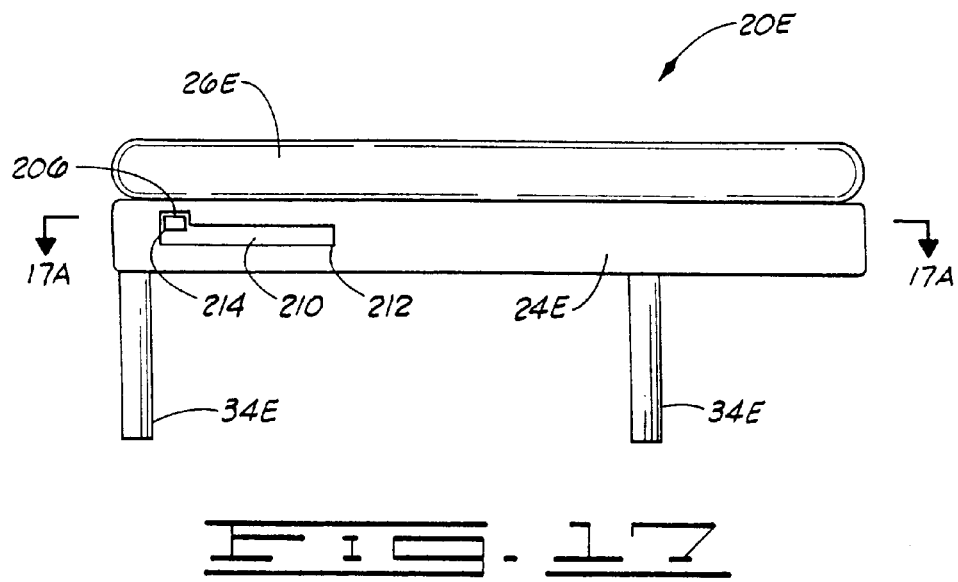
FIG. 17 is an elevational view of yet another embodiment of the commode assembly, showing a handle positioned in the locked position to protract the shelf segments.

Referring now to FIG. 17, shown is a toilet seat assembly 20E which is another embodiment of the present invention. The toilet seat assembly 20E is similar in function to the toilet seat assembly 20 described hereinabove except as follows, so the same numbers will be used with appropriate letter suffixes to indicate such identity of function.

Figure 17A:
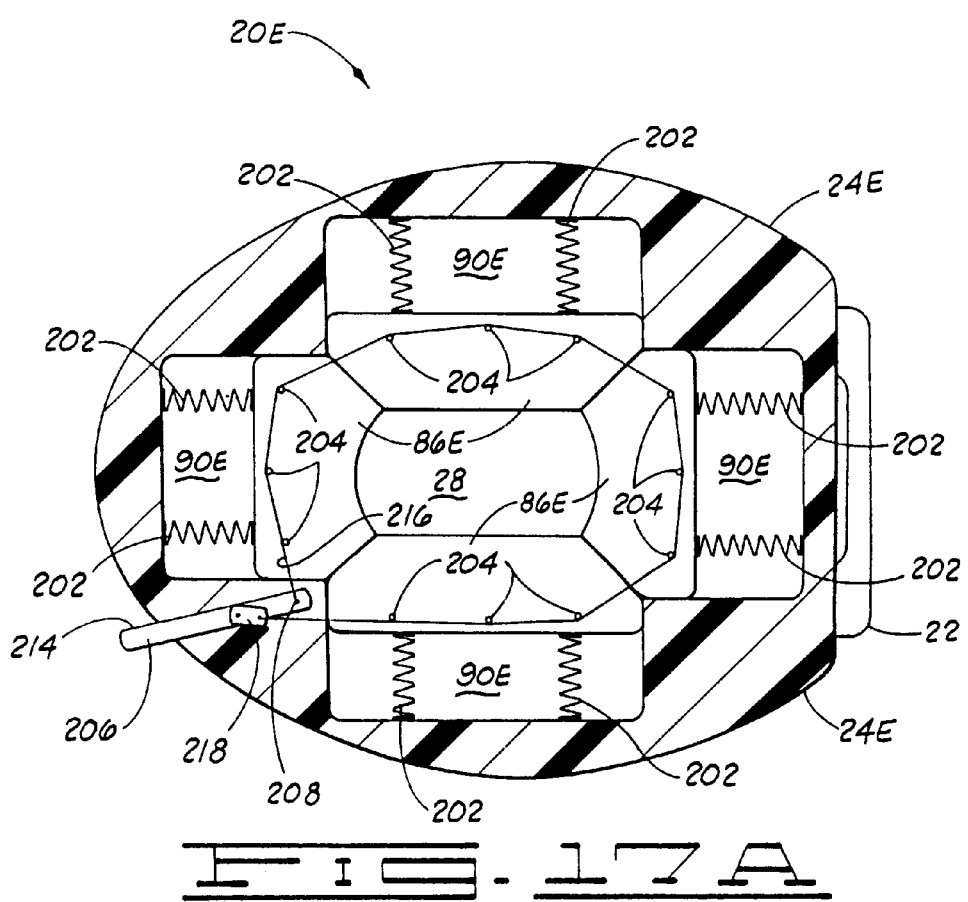
FIG. 17A is a view taken along 17A—17A of FIG. 17, showing the handle and cable cooperating with the roller assemblies, the shelf segments being in the protracted position.
Figure 17B:
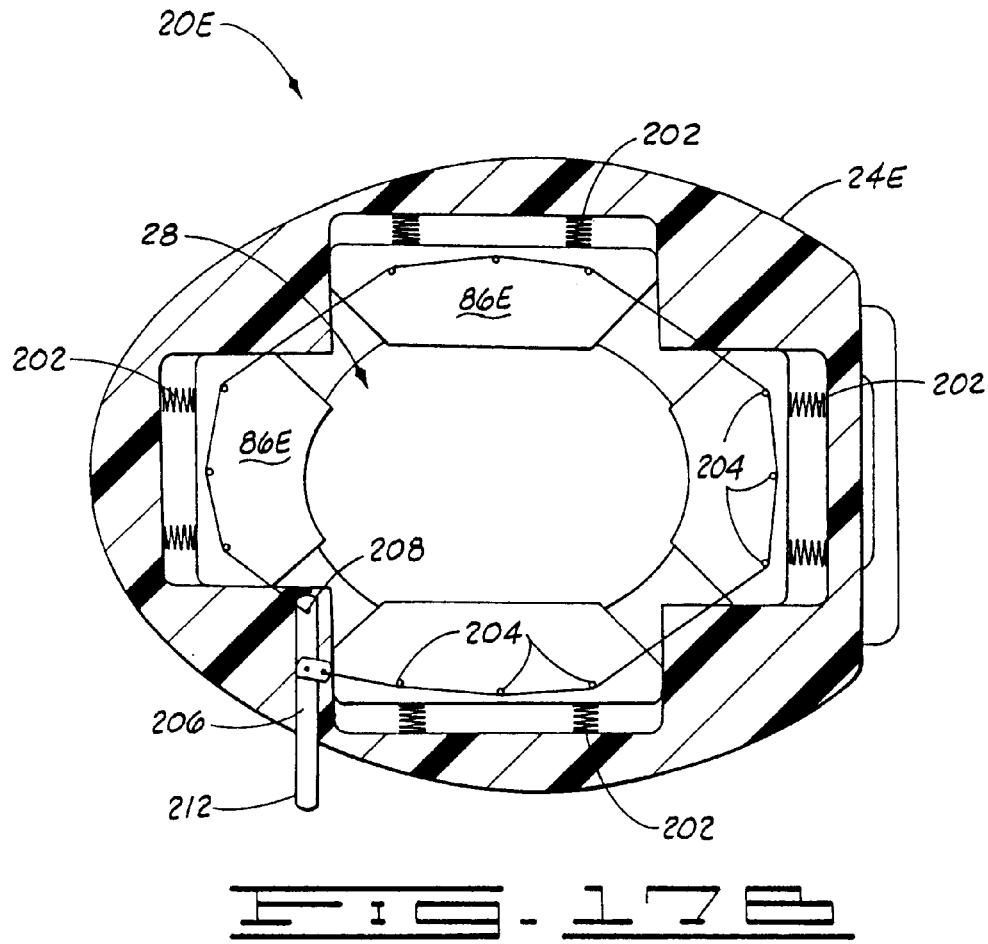
FIG. 17B is identical to FIG. 17A except the shelf segments are in the retracted positions.

The toilet seat assembly 20E, shown in its self-standing mode, has a rim member 24E with a cushion 26E, the rim member 24E supported by several retractable legs 34E (two of which are shown). As shown in FIG. 17A, four shelf segments 86E are supported in appropriately disposed notches 90E in the rim member 24E and protract to adjust the size of central aperture 28. Multiple sets of tension springs 202 are supported by the rim member 24E to engage the shelf segments 86E to provide force sufficient to normally hold the shelf segments 86E in the retracted, open position as depicted in FIG. 17B. A plurality of roller assemblies 204, several attached to each of the shelf segments 86E, are provided to move the shelf segments in unison. Each such roller assembly 204 is a roller and shoulder screw of conventional structure.

A handle 206 is pivotally supported in the rim member 24E and is connected to a handle pivot pin 208. The handle 206 extends through a slot 210 in the rim member 24E (as shown in FIG. 17) to allow the handle to be moved between an open position 212 and a closed position 214, the purpose of which will be more fully explained below.

A cable 216 is secured by one end thereof to a fixed point within the rim member 24E (preferably to the handle pivot pin 208 as shown in FIG. 17A), routed around the roller assemblies 204, and secured to the handle 206 at its distal end to the handle pivot pin 208 by a movable cable bracket 218. Movement of the handle 206 between the open position 212 and the closed position 214 provides a tension on the cable 216 which translates by way of the roller assemblies 204 to a force on the shelf segments 86E opposite in direction to the force exerted on the shelf segments 86E by the tension springs 202. When the tension springs 202 and the length of cable 216 are appropriately sized, movement of the handle 206 from the open position 212 to the closed position 214 will cause sufficient force upon the shelf segments 86E to overcome the retracting force from the tension springs 202, causing the shelf segments 86E to move to the protracted mode to reduce the size of the central aperture 28.

FIG. 17A shows the handle 206 in the closed position 214, resulting in the shelf segments 86E being in the protracted mode and thus suitable for pet usage of the commode assembly. Correspondingly, FIG. 17B shows the handle 206 in the open position 212, causing retraction of the shelf segments 86E to the retracted mode to fully open the central aperture 28E, making the toilet seat assembly 20E suitable for human usage of the commode assembly.

Figure 17C:
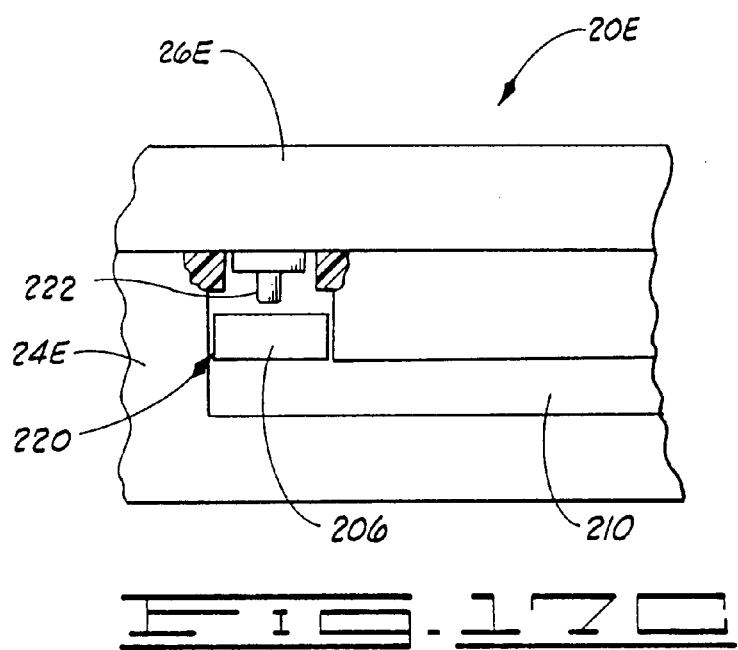
FIG. 17C is an enlarged, partial cutaway portion of the commode assembly of FIG. 17, showing a handle unlocking means.

A handle locking means, a detent cavity 220 (a portion of the slot 210) in the rim member 24E, is shown in FIG. 17C. The detent cavity 220 is used to lock the handle 206 in the closed position 214. Once locked, the handle 206 can be released by moving the handle 206 downward sufficiently to clear the detent cavity 220; that is, the handle 206 can be physically moved downward sufficiently to clear the detent cavity 220 and allow the handle 206 to move in the slot 210 to the open position 212 by means of the operation of the tension springs 202 on the shelf segments 86E. The cushion 26E is equipped with a release means, a pin 222, protruding from the cushion member 26E above the handle 206 in the detent cavity 220. As the weight of a human is borne by the cushion 26E, the pin 222 is caused to move downwardly to engage and displace the handle 206 sufficiently to clear the detent cavity 220 and allow the shelf segments 86E to retract to the open position and thereby remove the restriction of the central cavity 28. The handle can be returned to the closed position by the user or, as will be appreciated by persons skilled in the art, various means for automatically returning the handle to the closed position can be used.

FIG. 18 and 19

Figures 18, 19:
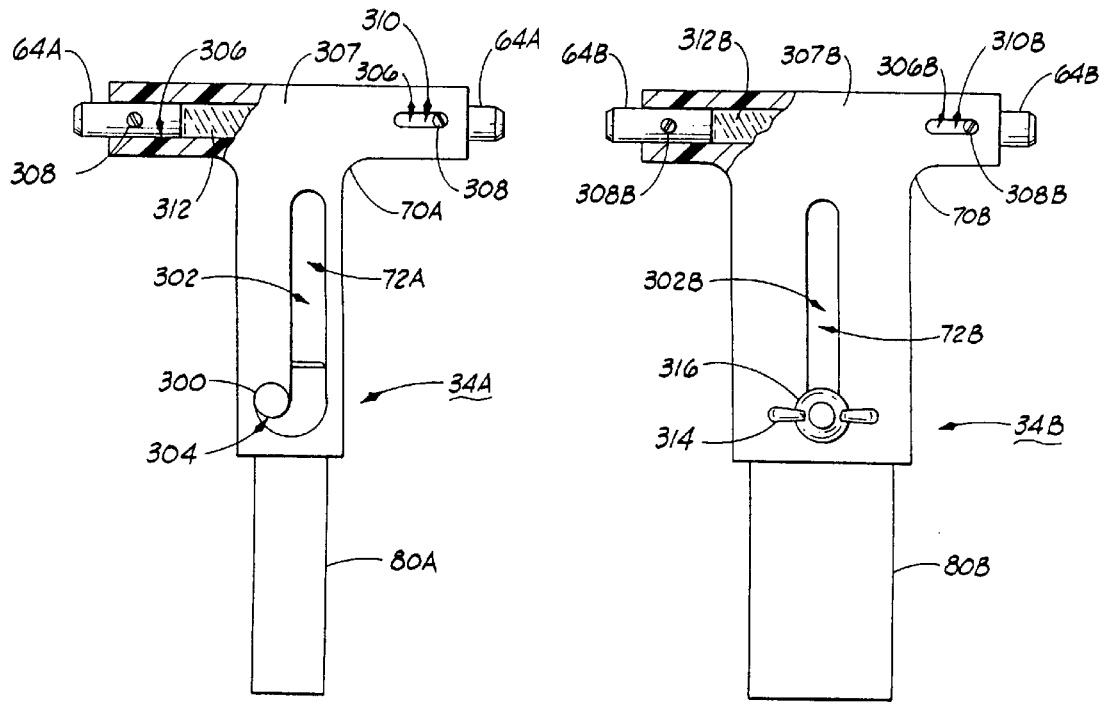
FIG. 18 is an enlarged elevational, partial cutaway view of an extendable, pivotal leg member.
FIG. 19 is a similar view of an alternative embodiment of an extendable, pivotal leg member.

FIG. 18 shows an enlarged view of a leg member 34A which is an alternative construction to the earlier described leg member 34. Each leg member 34A consists of a leg body 70A and a leg shaft 80A. The leg shaft 80A passes slidingly within a cavity 72A of the leg body 70A, and is adjustable between an extended position and a retracted position. A pin 300 extends from the leg shaft 80A through a slot 302 formed in the leg body 70A, and passes slidingly in the slot 302 as the leg shaft 80A moves within the leg body 70A. A detent groove 304 is formed at the distal end of the slot 302 to receive the pin member 300 and holds the leg shaft 80A in the locked position, to provide an extended, locked leg member 34A capable of supporting the commode assembly in a self-standing mode.

Each leg member 34A has a pair of pin members 64A disposed in a second cavity 306 of a cross portion 307 of the leg body 70A. A retaining pin 308 extends from each of the pin members 64A and passes slidingly through a slot 310 in the cross portion 307. The pin members 64A are in pressing engagement with a spring 312 disposed in the cavity 306, the spring 312 being in compression to exert a biasing force outward on the pin members 64A. Each retaining pin 308 is limited in travel to the extent of its respective slot 310, and thus retains the pin members 64A within the cavity 306 of the cross portion 307. As will be appreciated, appropriately disposed receiving apertures can be provided in the rim member 24 to receive the pin members 64A of each leg member 34A so that the commode assembly can be supported thereby.

FIG. 19 shows an enlarged view of a leg member 34B which is another alternative construction to the earlier described leg member 34. Each leg member 34B consists of a leg body 70B and a leg shaft 80B. The leg shaft 80B passes slidingly within a cavity 72B of the leg body 70B, and is adjustable between an extended position and a retracted position. A threaded member 316 extends from the leg shaft 80B through a slot 302B formed in the leg body 70B, and passes slidingly in the slot 302B as the leg shaft 80B moves within the leg body 70B. A nut member 314 is disposed on the threaded member 316, and tightening the nut member 314 causes the leg shaft 80B to lock in a desired position within the leg body 70B. As is apparent from FIG. 19 the leg shaft 80B is lockable in a retracted position, a fully extended position, or any partially extended position therebetween by tightening of the nut member 314 to provide an extended, locked leg member 34B capable of supporting the commode assembly in a self-standing mode.

Each leg member 34B has a pair of pin members 64B disposed in a second cavity 306B of a cross portion 307B of the leg body 70B. A retaining pin 308B extends from each of the pin members 64B and passes slidingly through a slot 310B in the cross portion 307B. The pin members 64B are in pressing engagement with a spring 312B disposed in the cavity 306B, the spring 312B being in compression to exert a biasing force outward on the pin members 64B. Each retaining pin 308B is limited in travel to the extent of its respective slot 310B, and thus retains the pin members 64B within the cavity 306B of the cross portion 307B. As will be appreciated, appropriately disposed receiving apertures can be provided in the rim member 24 to receive the pin members 64B of each leg member 34B so that the commode assembly can be supported thereby.

FIG. 20

Figure 20:
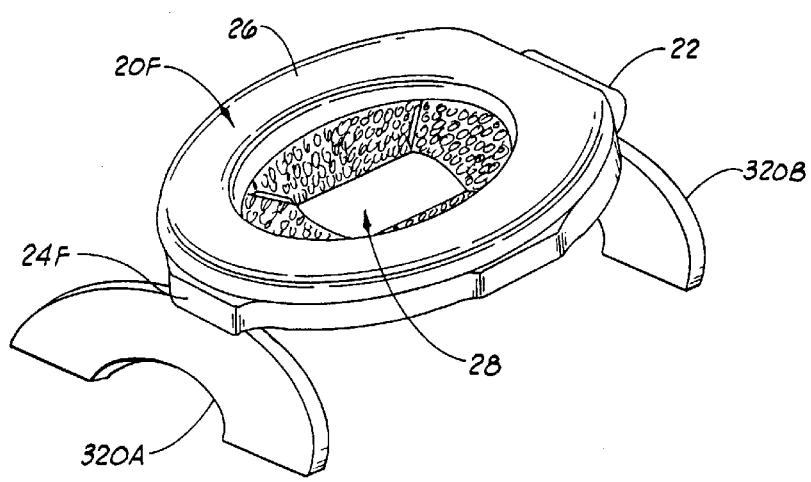
FIG. 20 is a perspective view of a commode assembly having hinged leg segments unfolded to support the commode assembly in a self-standing mode.

Turning now to FIG. 20, shown therein is a toilet seat assembly 20F of the present invention depicted in the self standing mode (as also illustrated and described hereinabove for the toilet seat assembly 20 in FIG. 2 and the toilet seat assembly 20D in FIG. 16). The toilet seat assembly 20F is the same as that described for the toilet seat assembly 20 with the exception that support for the toilet seat assembly 20F in its self standing mode is provided by a pair of leg segments 320A, 320B, each of the leg segments 320A, 320B pivotally connected to a rim member 24F by hinges (not shown). The areas of the leg segments 320A, 320B together conform to the size and shape of the bottom of the rim member 24 when the leg segments 320A, 320B are pivoted up for attachment of the toilet seat assembly 20F to a toilet bowl 12 when used in a toilet bowl mounted mode. Appropriate detent means (not shown) such as protruding detent tabs can be provided on the rim member 24F for the purpose of providing retaining forces on the sides of the leg segments 320A, 320B when retracted.

Figure 21:
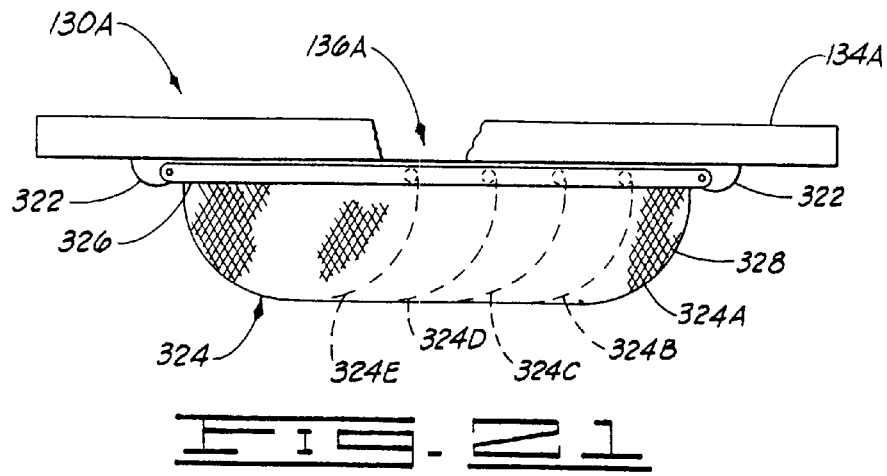
FIG. 21 is an elevational view of an alternative embodiment of the training tray of the present invention.
Figure 22:
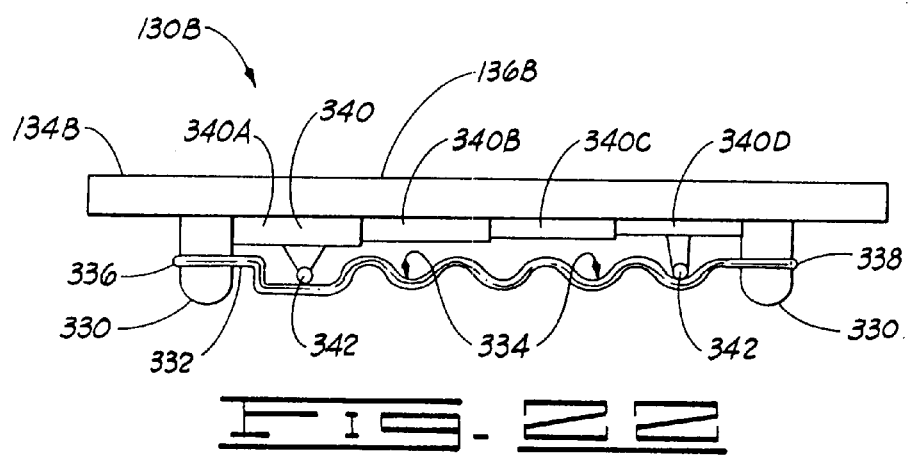
FIG. 22 and FIG. 23 are similar views of other training tray embodiments.
Figure 23:
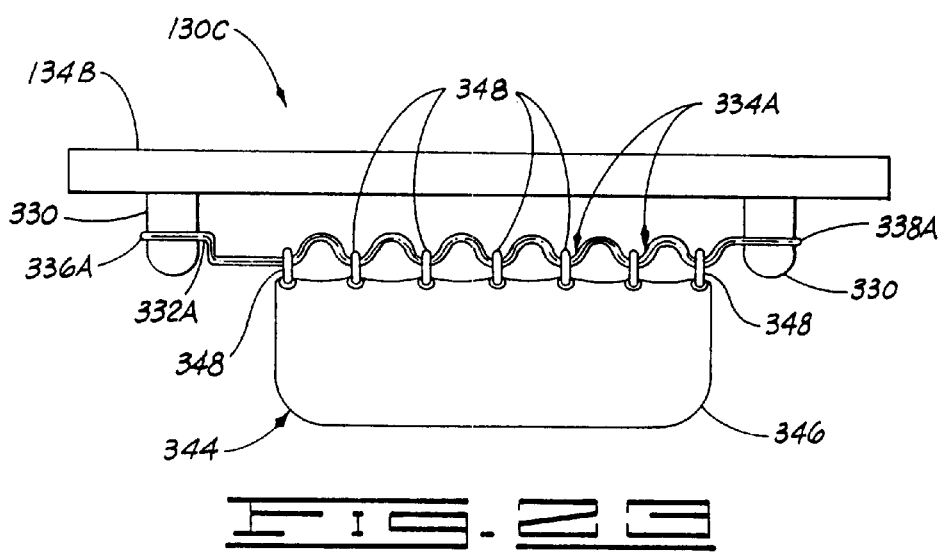
Figure 27:
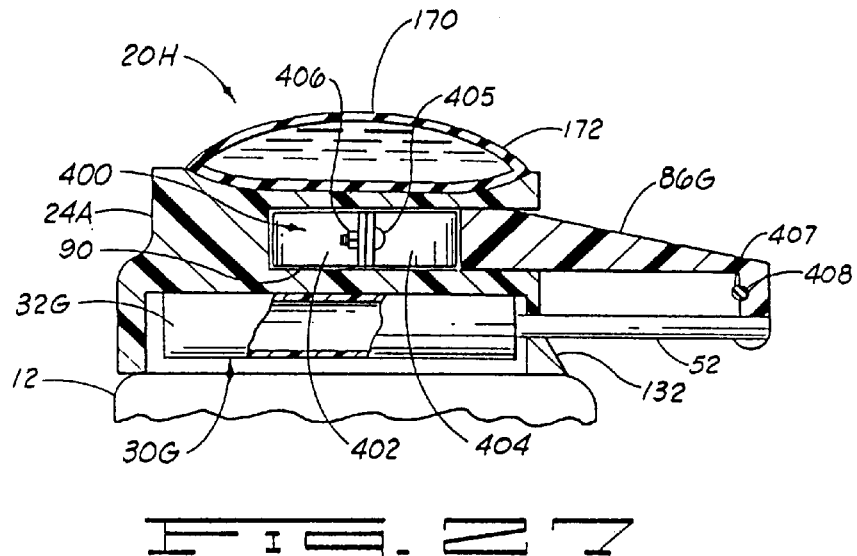
FIG. 27 is an alternative embodiment of the commode assembly of FIG. 15.
Figure 28:
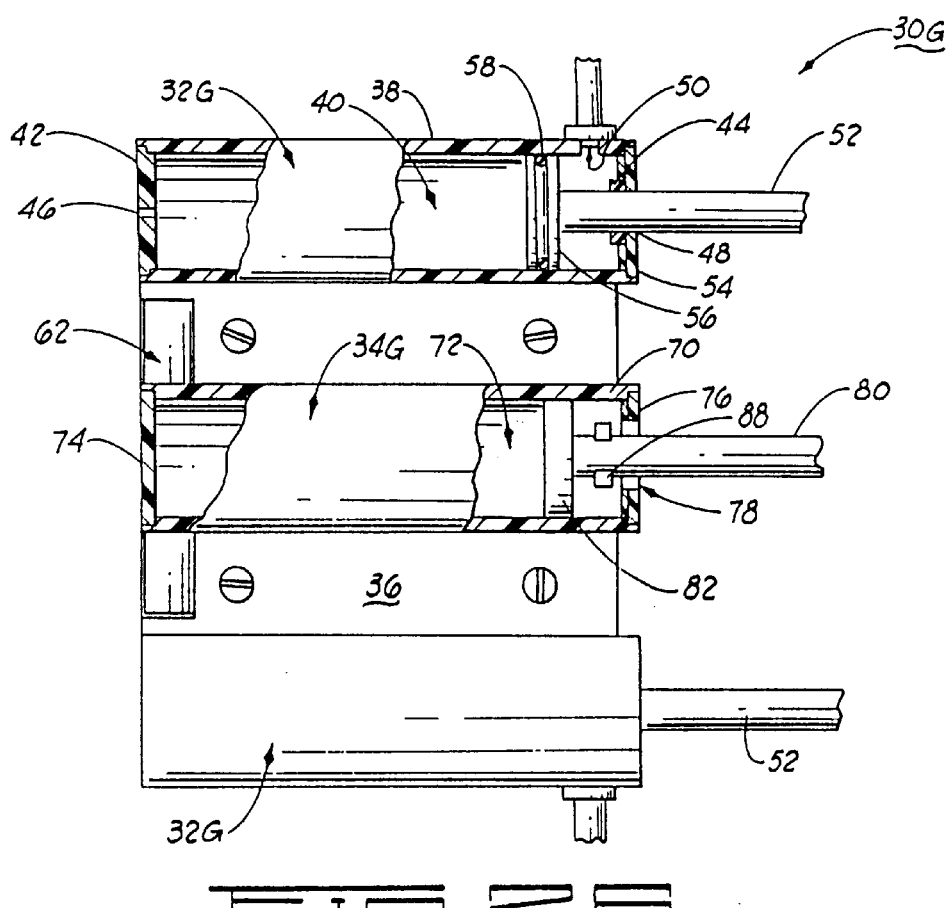

FIGS. 21, 22 and 23

FIGS. 21, 22 and 23 show various training trays as alternatives to the above described training tray 130. FIG. 21 shows a training tray 130A, which is similar in function to the training tray 130, so the same numbers will be used with appropriate letter suffixes to indicate such identity of function.

The training tray 130A has a top member 134A which forms a central aperture 136A therein. The training tray 130A is supported by the toilet seat assembly in like manner described above; that is, the top member 134A is supported by the support ridge 132 of the rim member 24 so that the central aperture 136A registers with the central aperture 28. A plurality of latch members 322 extend from the lower surface of the top member 134A, and preferably, the latch members 322 are integrally formed with the top member 134A. A bowl or litter container 324 provides a cavity for holding litter and is supported below the top member 134A. The litter container 324 has a frame 326 which is a ring shaped member generally forming an oval or circle somewhat larger than the central aperture 136A. The number and location of latch members 322 around the central aperture 136A is such that the frame 326 can be easily snapped in and out of engagement with the latch members 322. Of course, the litter container 324 can be integrally formed as an extending portion of the frame 326.

The litter container 324, which forms the litter holding cavity for use during the training steps used in conjunction with the commode assembly, restricts a pet's view of water below the toilet seat assembly 20 in the toilet bowl 12. As the pet becomes accustomed to using the commode assembly, the amount of view restriction is gradually decreased by replacing the litter container 324 with a marginally smaller litter container 324A (partially depicted in broken lines in FIG. 21 to illustrate its reduction in size relative to the litter container 324). In like manner, when the pet is accustomed to using the commode assembly with litter container 324A in place, it is replaced with a marginally smaller litter container 324B (also partially depicted by broken lines in FIG. 21). This procedure continues with progressively smaller bowls, as shown in FIG. 21 by litter containers 324C, 324D, and 324E (also partially shown in broken lines in FIG. 21). Upon successful training of the pet to use the commode assembly with the smallest litter container 324E, the training tray 130A can be removed from the commode assembly and the pet will have been trained to eliminate directly into the toilet bowl 12 through the central aperture 28.

Referring now to FIG. 22, shown therein is a training tray 130B having a top member 134B which forms a central aperture 136B therein. The training tray 130B is supported by the toilet seat assembly 20 in like manner described above; that is, the top member 134B is supported by the support ridge 132 of the rim member 24 so that the central aperture 136B registers with the central aperture 28. A pair of posts 330 extend from the lower surface of the top member 134B on each side of the central aperture 136B, and preferably, the posts 330 are integrally formed with the top member 134A.

A pair of track members 332 is provided (only one of which is shown), each of the track members 332 supported by one pair of posts 330 at a first end 336 and at a distal end 338 thereof. Each track member 332 has a plurality of detent troughs 334. A segmented tray 340 is constructed of a plurality of interlocking, telescoping segments 340A, 340B, 340C, and 340D. The segmented tray 340 has a pair of support leg members 342 connected at each end and extending from opposite sides of the segmented tray 340 so that the support leg members 342 are supported in opposing detent troughs 334 in the track members 332. In this manner, the track member 332 provides support for the segmented tray 340.

The segmented tray 340 provides a litter holding area for use during the training steps used in conjunction with the commode assembly. The segmented tray 340 furthermore restricts the pet's view of water below in the toilet 12 as seen through the central aperture 136B. As the pet overcomes fear of the water and becomes accustomed to using the commode assembly, the amount of view restriction is gradually decreased by retracting the segmented tray 340. To retract the segmented tray 340, the segment 340D is collapsed into the segment 340C and the leg members connected thereto are repositioned into the next detent trough 334 of the track member 332. In like manner, when the pet is accustomed to use of the commode assembly in this mode, the restriction of the central aperture 136B is further decreased by collapsing segment 340C into segment 340B and so forth, as the segmented tray 340 is reduced in size to open more of the central aperture 136B and to thereby provide a greater view of the water below the toilet seat assembly 20 in the toilet bowl 12. Upon successful training of the pet to use the commode assembly with the smallest restriction of the central aperture 136B, the training tray 130B can be removed from the commode assembly to permit the pet to eliminate directly into the toilet bowl 12 through the central aperture 28.

FIG. 23 shows another alternative training tray 130C which is also supportable by the support posts 330 (shown in FIG. 22) in like manner to the above described track members 332. That is, a pair of track members 332A are supported beneath the top member 134B and support a litter container 344. Each of the track members 332A is attached by one pair of posts 330 at a first end 336A and at a distal end 338A thereof. Each track member 332A has a plurality of detent troughs 334A. The litter container 344 has a bowl 346 having attached thereto a plurality of rings 348 on opposing sides of the bowl 346. The rings 348 are disposed to hang from the track member 332A; that is, the track member 332A passes through each ring 348. The rings 348 rest in the detent troughs 334A of the track members 332A, and thus the litter container 344 is supported by the track members 332A.

The litter container 344 provides a litter holding cavity for use during the training steps used in conjunction with the commode assembly. The litter container furthermore restricts the pet's view of water below the toilet assembly 20 in the toilet bowl 12 as seen through the central aperture 136B. As the pet overcomes fear of the water and becomes accustomed to using the commode assembly, the amount of view restriction is gradually decreased by retracting the litter container 344. To retract the litter container 344, the pair of rings 348 nearest the distal end 338A of the track members 332A are repositioned to the next detent troughs in a direction toward the first end 336A of the track member 332A.

In like manner, when the pet is accustomed to use of the commode assembly in this mode, the restriction of view through the central aperture 136B is further decreased by repositioning the rings nearest the distal end 338A of the track member 332A a distance of one additional detent trough 334A in a direction toward the first end 336A of the track member 332A. The restriction through the central aperture 136B is thereby gradually decreased by generally repositioning the rings 348 toward the first end 336A of the track member 332A, and in doing so, collapsing and drawing the bowl 346 like that of a curtain being opened upon a supporting rod.

Upon successful training of the pet to use the commode assembly with all the rings 348 disposed in the detent trough 334A nearest the first end 336A of the track member 332A, that is the smallest restriction of the central aperture 136B, the training tray 130C can be removed from the commode assembly to permit the pet to eliminate directly into the toilet bowl 12 through the central aperture 28.

FIGS. 24, 25, 26 and 27

Referring now to FIGS. 24, shown is a toilet seat assembly 20G which is an alternative embodiment of the present invention. The toilet seat assembly 20G is identical in function to the toilet seat assembly 20 described hereinabove except as follows, so the same numbers will be used with appropriate letter suffixes to indicate such identity of function.

As with toilet seat assembly 20 (as shown in FIG. 5), toilet seat assembly 20G (shown in FIG. 24) has an oval shaped rim member 24 and a cushion 26 on the rim member 24. However, toilet seat assembly 20G has a plurality of simple beam spring assemblies 400 disposed within the notches 90 of the rim member 24. As shown in FIG. 25, each simple beam spring assembly 400 includes two simple beam springs 402, 404 disposed opposite one another and fastened together by screws 406 or other suitable means for fastening. The simple beam spring assemblies 400 bias the shelf segments 86G to the protracted position. An O-ring spring 407 rests in notches 408 on the bottom side of the shelf segments 86G. The O-ring spring 407 helps to maintain uniform movement of the shelf segments 86G and provides a force which, along with the simple beam spring assemblies 400, biases the shelf segments 86G to the protracted position.

The rim member 24 supports multiple sets of cylinder and leg assemblies 30G, one of which is shown in FIG. 26. The cylinder and leg assembly 30G has a pair of parallel fluid cylinders 32G and a rotatable leg member 34G interconnected by a bracket member 36. The bracket member 36 can be integrally formed with the cylindrical bodies 38 as shown. Alternative embodiments may utilize separate leg assemblies, as described above, and can reduce the number of fluid cylinders 32G per shelf segment.

Each fluid cylinder 32G consists of a cylindrical body 38 having a bore 40, with both ends thereof enclosed by a first cylinder end wall 42 and a second cylinder end wall 44. Because shelf segment 86G is biased to the protracted position by the simple beam spring assembly 400 and the O-ring spring 407, no springs are present within the fluid cylinders 32G or the leg member 34G (compare with cylinder springs 60 and leg spring 84 shown in FIG. 4 of toilet seat assembly 20).

The first cylinder end wall 42 contains an air bleed port 46 extending through it, allowing air to pass out of and into the bore 40. The second cylinder end wall 44 contains a cylinder shaft aperture 48. The fluid cylinder 32G contains an inlet port 50 extending through the cylindrical body 38, located near the second cylinder end wall 44 end of the fluid cylinder 32G. A cylinder shaft 52 passes slidingly through the cylinder shaft aperture 48. A cylinder shaft seal 54 provides a fluid tight seal between the bore 40 and the cylinder shaft aperture 48.

A cylinder piston 56 is affixed to one end of the cylinder shaft 52. The cylinder piston 56 contains a bore seal 58 which provides a fluid tight seal between the cylinder piston 56 and the second cylinder end wall 44. Pressurized fluid entering the bore 40 through the inlet port 50 fills the bore 40 between the cylinder piston 56 and the second cylinder end wall 44. When the fluid pressure is great enough to overcome the opposing forces of the simple beam spring assembly 400, the O-ring spring 407, and the frictional forces on the bore seal 58 and the cylinder shaft seal 54, the cylinder piston 56 is displaced in a direction toward the first cylinder end wall 42 end of the fluid cylinder 32G. Returning to FIG. 24, the shelf segments 86G slidingly move radially within the notches 90 in the rim member 24. The radial locations of the shelf segments 86G are controlled by the action of the fluid cylinders 32G of the cylinder and leg assemblies 30G disposed about the rim member 24 and by the simple beam spring assemblies 400 and the O-ring spring 407. At low fluid pressure, the shelf segments 86G and the cylinder pistons 56 are biased outwardly by the simple beam spring assemblies 400 and the O-ring spring 407. This allows usage of the toilet seat assembly by a pet animal user.

When a human sits on the cushion 26, the weight thereof causes, in the manner described hereinabove with reference to toilet seat assembly 20, an increase in fluid pressure to the cylinder and leg assemblies 30G. As the fluid pressure is increased on the cylinder pistons 56 of the cylinder and leg assemblies 30G, the cylinder pistons are caused to retract, and this causes the shelf segments 86G to move radially toward the rim member 24. At high fluid pressure, the shelf segments 86G are retracted within the rim member 24, and the toilet seat assembly allows usage by the human user.

Although the present alternative embodiment was described with respect to the toilet seat assembly 20, it will be apparent to those skilled in the art that the alternative embodiment can be applied in the same manner to the toilet seat assembly 20A described above, as is depicted in FIG. 27.

It will be clear that the present invention is well adapted to carry out the objects and to attain the advantages mentioned, as well as those inherent therein. While presently preferred embodiments of the invention have been described for the purposes of this disclosure, numerous changes can be made which will readily suggest themselves to those skilled in the art. For example, although the present invention is described with regard to its applicability to the training and care of domestic pet animals, it will be recognized that many aspects of the present invention have applicability for use by other small users as well, such as children. Such changes are encompassed within the spirit and scope of the invention disclosed and as defined in the appended claims.

What is claimed is:

1. A toilet seat for use by a human and by a pet animal user, comprising:

a rim member having a central aperture;

shelf means adjustably mounted to the rim member for adjusting the size of the central aperture, the shelf means having a plurality of shelf segments which are positionable in one of a protracted position and a retracted position, the shelf segments reducing the size of the central aperture in the protracted position and the shelf segments leaving the central aperture substantially open when in the retracted position, the shelf segments capable of supporting the weight of a pet animal user when in the protracted position; and cable means for adjusting the shelf segments between the protracted position and the retracted position, the cable means comprising:

at least one roller assembly attached to the shelf means; and a cable engaging the roller assembly and having an adjustable tension so that the shelf segments can be changed selectively to be positioned in the protracted position and the retracted position.

2. The toilet seat of claim 1 wherein the cable means further comprises:

means secured to the rim member and to the cable for adjusting the tension on the cable so that the shelf segments can be changed between the protracted position and the retracted position.

3. The toilet seat of claim 2 wherein the shelf means further comprises:

biasing means for biasing the shelf segments to one of the retracted and protracted positions.

4. The toilet seat of claim 3 wherein the cable means further comprises:

means for locking the shelf segments so that the shelf segments are maintained in a selected one of the protracted and the retracted positions.

5. The toilet seat of claim 4 comprising:

training tray means for providing a litter holding cavity disposed below the central aperture of the rim member.

6. The toilet seat of claim 5 wherein the training tray means comprises:

a top training tray member removably supportable by the rim member, the top training tray member having a training aperture coextensive to the central aperture of the rim member; and an aperture adjustment means for adjusting the size of the training aperture to allow training of pet animal users.

7. The toilet seat of claim 1 further comprising:

support means connected to the rim member for supporting the rim member spatially above a floor surface so that the toilet seat can be used for training of pet animal users.

8. The toilet seat of claim 7 wherein the support means comprises:

a pair of hinges attached to the bottom of the rim member; and a pair of leg segments pivotally connected to the rim member by the hinges, the leg segments conforming substantially to the shape of the bottom of the rim member when the leg segments are pivoted upward.

9. A toilet seat for a human user and for a pet animal user, comprising:

a rim member having a central aperture;

shelf means adjustably mounted to the rim member and having a protracted and a retracted position for adjusting the size of the central aperture and for supporting the weight of the pet animal user when in the protracted position, the shelf means comprising:

at least one shelf segment adjustably mounted to the rim member so that the shelf segment is moveable between the protracted position and the retracted position, the shelf segment reducing the size of the central aperture in the protracted position, and the shelf segment leaving the central aperture substantially open in the retracted position, the shelf segment capable of supporting the pet animal user in the protracted position; and cable means for moving the shelf means from the protracted position to the retracted position when the toilet seat is used by the human user, the cable means comprising:

at least one roller assembly attached to the shelf means; and a cable engaging the roller assembly and having an adjustable tension so that the shelf segment can be changed selectively to be positioned in the protracted position and the retracted position.

10. The toilet seat of claim 9 wherein the cable means further comprises:

biasing means for biasing the shelf segment to one of the retracted and protracted positions.

11. The toilet seat of claim 10 wherein the cable means further comprises:

handle means secured to the rim member and to the cable for adjusting the tension on the cable so that the shelf segments can be changed between the protracted position and the retracted position.

12. The toilet seat of claim 11 wherein the cable means further comprises:

handle locking means for locking the handle means so that the shelf segments are maintained in a selected one of the protracted and the retracted positions.

13. The toilet seat of claim 12 comprising:

training tray means for providing a litter holding cavity disposed below the central aperture of the rim member.

14. The toilet seat of claim 13 wherein the training tray means comprises:

a top training tray member removably supportable by the rim member, the top training tray member having a training aperture coextensive to the central aperture of the rim member; and an aperture adjustment means for adjusting the size of the training aperture to allow training of pet animal users.

15. The toilet seat of claim 14 further comprising:

support means connected to the rim member for supporting the rim member spatially above a floor surface so that the toilet seat can be used for training of pet animal users.

16. The toilet seat of claim 15 wherein the support means comprises:

hinges attached to the bottom of the rim member; and leg segments pivotally connected to the rim member by the hinges, the leg segments conforming substantially to the shape of the bottom of the rim member when the leg segments are pivoted upward.

17. An improved toilet seat for use by a human and a pet animal user, the toilet seat comprising:

a rim member having a central aperture;

shelf means adjustably mounted to the rim member and having a protracted and a retracted position for adjusting the size of the central aperture and for supporting the weight of the pet animal user when in the protracted position, the shelf means comprising:

a plurality of shelf segments adjustably mounted to the rim member so that the shelf segments are adjustable between the protracted position to reduce the size of the central aperture and to provide a platform capable of supporting pet animal users, and the retracted position which leaves the central aperture substantially open; and shelf adjustment means for adjusting the shelf segments from the protracted position to the retracted position, and wherein the shelf adjustment means comprises:

cable means for adjusting the shelf segments between the protracted position and the retracted position, the cable means comprising:

at least one roller assembly attached to the shelf segments;

a cable engaging the roller assembly and having adjustable tension so that the shelf segments can be adjusted between the protracted position and the retracted position;

means secured to the rim member and to the cable for adjusting the tension on the cable so that the shelf segments can be adjusted between the protracted position and the retracted position;

means connected to the rim member for maintaining the shelf segments in the protracted position; and release means connected to the rim member for releasing the shelf segments from the retracted position; and biasing means for biasing the shelf segments to the retracted position.

18. The improved toilet seat of claim 17 further comprising:

training tray means removably supported by the rim member for providing a litter holding cavity disposed below the central aperture of the rim member.

19. The improved toilet seat of claim 18 wherein the training tray means comprises:

a top training tray member removably supported by the rim member, the top training tray member having a training aperture coextensive to the aperture of the rim member; and an aperture adjustment means for adjusting the size of the training aperture to allow training of pet animal users.

20. The improved toilet seat of claim 19 further comprising:

support means connected to the rim member for supporting the rim member spatially above a floor surface to provide for training of pet animal users.

21. The improved toilet seat of claim 20 wherein the support means comprises:

leg means connected to the rim member and extendible therefrom for supporting the rim member during training of pet animal users.

22. The improved toilet seat of claim 21 wherein the support means further comprises:

hinge means for pivotally connecting the leg means to the rim member.

23. The improved toilet seat of claim 22 wherein the leg means comprises:

a leg body connectable to the rim member;

a leg shaft supported by the leg body and selectively extendible therefrom; and locking means to lock the leg shaft at a selected extension from the leg body.

24. The improved toilet seat of claim 19 wherein the aperture adjustment means comprises:

a plurality of side members extending downward from the bottom of the top training tray member and positioned around the training aperture; and a folding shelf attached to at least one side member for varying the size of the training aperture.

25. The improved toilet seat of claim 19 wherein the aperture adjustment means comprises:

a plurality of latch members extending downward from the bottom of the training tray member and positioned around the training aperture; and a removable litter container which engages a plurality of the latch members for restricting the size of the central aperture.

26. The improved toilet seat of claim 19 wherein the aperture adjustment means comprises:

a plurality of posts extending downward from the bottom of the training tray member and positioned around the training aperture;

a plurality of track members, each track member having a plurality of detent troughs and supported by a plurality the posts; and a segmented tray having a plurality of support leg members adjustably supported in the detent troughs for varying the size of the training aperture.

27. The improved toilet seat of claim 19 wherein the aperture adjustment means comprises:

a plurality of posts extending downward from the bottom of the training tray member and positioned around the training aperture;

a plurality of track members, each track member having a plurality of detent troughs and supported by a plurality the posts;

a plurality of rings hanging from the track members and resting in the detent troughs of the track members; and a bowl hanging from the plurality of rings for varying the size of the training aperture.

* * * * *